United States Patent
Mi et al.

(10) Patent No.: US 12,512,923 B2
(45) Date of Patent: Dec. 30, 2025

(54) OPTICAL SIGNAL PROCESSING APPARATUS AND METHOD

(71) Applicant: HUAWEI TECHNOLOGIES CO., LTD., Guangdong (CN)

(72) Inventors: Guangcan Mi, Shenzhen (CN); Xu Sun, Shenzhen (CN); Yanbo Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 282 days.

(21) Appl. No.: 18/190,733

(22) Filed: Apr. 6, 2023

(65) Prior Publication Data
US 2023/0239067 A1    Jul. 27, 2023

Related U.S. Application Data

(63) Continuation of application No. PCT/CN2021/118534, filed on Sep. 15, 2021.

(30) Foreign Application Priority Data

Sep. 28, 2020 (CN) ........................ 202011042245.2

(51) Int. Cl.
*H04B 10/50* (2013.01)
*H04B 10/079* (2013.01)
(Continued)

(52) U.S. Cl.
CPC ........ *H04J 14/0201* (2013.01); *H04B 10/293* (2013.01); *H04B 10/506* (2013.01); *H04B 10/07955* (2013.01)

(58) Field of Classification Search
None
See application file for complete search history.

(56) References Cited

U.S. PATENT DOCUMENTS

| 5,513,029 A | * | 4/1996 | Roberts | H04B 10/0777 |
| | | | | 398/94 |
| 6,240,109 B1 | * | 5/2001 | Shieh | H01S 5/0687 |
| | | | | 372/18 |

(Continued)

FOREIGN PATENT DOCUMENTS

| CN | 201828394 U | 5/2011 |
| CN | 104506233 A | 4/2015 |

OTHER PUBLICATIONS

International Search Report and Written Opinion in International Appln. No. PCT/CN2021/118534, mailed on Dec. 14, 2021, 18 pages (with English translation).

*Primary Examiner* — Jai M Lee
(74) *Attorney, Agent, or Firm* — Fish & Richardson P.C.

(57) ABSTRACT

Example optical signal processing apparatuses and methods are provided. One example apparatus includes: N light sources, a wavelength multiplexer, an optical processor, a dither application circuit, a first detection circuit, a second detection circuit, and a feedback control circuit. The light source generates a single-wavelength signal. The dither application circuit applies a dither signal to the light source. The wavelength multiplexer generates a multi-wavelength signal based on the single-wavelength signal. The first detection circuit is configured to obtain a first power signal of a signal input to the optical processor. The second detection circuit is configured to obtain a second power signal of a signal output from the optical processor. The feedback control circuit adjusts a working parameter of the optical processor based on the dither signal corresponding to the single-wavelength signal, the first power signal, and the second power signal.

20 Claims, 8 Drawing Sheets

(51) Int. Cl.
*H04B 10/293* (2013.01)
*H04J 14/02* (2006.01)

(56) References Cited

U.S. PATENT DOCUMENTS

| | | | | |
|---|---|---|---|---|
| 6,483,617 | B1 * | 11/2002 | Roberts | H04B 10/2563 |
| | | | | 398/32 |
| 7,321,728 | B2 * | 1/2008 | Harley | H04B 10/077 |
| | | | | 398/32 |
| 8,781,327 | B2 * | 7/2014 | Shen | H04J 14/0279 |
| | | | | 398/43 |
| 9,083,459 | B2 * | 7/2015 | Oda | H04B 10/572 |
| 11,139,907 | B2 * | 10/2021 | Melikyan | H04B 1/1027 |
| 2009/0232493 | A1 * | 9/2009 | Tu | H01S 5/0687 |
| | | | | 398/17 |
| 2012/0087657 | A1 * | 4/2012 | Jander | H04J 14/02 |
| | | | | 398/48 |

* cited by examiner

OPTICAL SIGNAL PROCESSING APPARATUS AND METHOD

CROSS-REFERENCE TO RELATED APPLICATIONS

This application is a continuation of International Application No. PCT/CN2021/118534, filed on Sep. 15, 2021, which claims priority to Chinese Patent Application No. 202011042245.2, filed on Sep. 28, 2020. The disclosures of the aforementioned applications are hereby incorporated by reference in their entireties.

TECHNICAL FIELD

Embodiments of this application relate to the communication field, and in particular, to an optical signal processing apparatus and an optical signal processing method.

BACKGROUND

At present, in a known optical signal processing technology, operating wavelengths of a plurality of optical signal processing devices (for example, filters or optical modulators) are different, and the plurality of optical signal processing devices are serially connected, so that a plurality of wavelengths in a multi-wavelength optical signal can be separately processed by using the plurality of optical signal processing devices.

However, due to impact of a change of an applied voltage and an operating environment (for example, a temperature), the operating wavelengths of the optical signal processing devices may change, causing processing errors and crosstalk between the wavelengths, and affecting accuracy and reliability of optical signal processing.

Therefore, an effective feedback control mechanism needs to be provided, to implement monitoring and modulation of an operating wavelength of each optical signal processing device. In a possible manner, a dedicated monitor device is configured for each optical signal processing device. To be specific, the monitor device may detect a power ratio of an input wavelength to an output wavelength of the corresponding optical signal processing device, to determine whether the operating wavelength of the optical signal processing device matches a design value.

However, input power is affected by a current operating wavelength of the optical signal processing device, and may not be power corresponding to a designed operating wavelength, causing an inaccurate detection result. In addition, the manner in which the dedicated monitor device is independently configured for each optical signal processing device greatly increases costs and affects miniaturization of the apparatus.

SUMMARY

This application provides an optical signal processing apparatus and method, to improve reliability and accuracy of feedback control on a working status of an optical processing device, reduce costs of the feedback control on the working status of the optical processing device, and implement device miniaturization.

According to a first aspect, an optical signal processing apparatus is provided. The optical signal processing apparatus is used in signal processing of a multi-wavelength signal including N wavelengths. The optical signal processing apparatus includes: N light source units, a wavelength multiplexing unit, an optical processing unit, at least one dither application unit, a first detection unit, a second detection unit, and a feedback control unit, where N≥2. The N light source units one-to-one correspond to the N wavelengths, and each light source unit is configured to generate a single-wavelength signal of the corresponding wavelength. The dither application unit is configured to apply a dither signal to each light source unit, so that power of each single-wavelength signal changes based on the dither signal, where first parameters of any two single-wavelength signals are different, and the first parameter includes at least one of the following parameters: a time period in which the dither signal is applied and a frequency of the applied dither signal. The wavelength multiplexing unit is configured to perform wavelength multiplexing processing on the N single-wavelength signals to generate the multi-wavelength signal. The optical processing unit includes N processing subunits, the N processing subunits are serially connected, the N processing subunits one-to-one correspond to the N wavelengths, and each processing subunit is configured to process the corresponding wavelength. The first detection unit is configured to obtain a first power signal corresponding to the multi-wavelength signal input to the optical processing unit. The second detection unit is configured to obtain a second power signal corresponding to a multi-wavelength signal output from the optical processing unit. The feedback control unit is configured to adjust a working parameter of an $i^{th}$ processing subunit in the N processing subunits based on a first parameter of a dither signal corresponding to an $i^{th}$ single-wavelength signal in the N single-wavelength signals, the first power signal, and the second power signal, where the $i^{th}$ single-wavelength signal corresponds to the $i^{th}$ processing subunit, and $i \in [1, N]$.

The solution provided in this application is applicable to a processing apparatus for a multi-wavelength signal. The processing apparatus includes a plurality of processing subunits. Each processing subunit is configured to process one wavelength in the multi-wavelength signal. A dither signal is applied to a light source of each wavelength in the multi-wavelength signal, so that first parameters of dither signals applied to any two wavelengths in the multi-wavelength signal are different, where the first parameter may include a time period in which the dither signal is applied and/or a frequency of the applied dither signal. Therefore, power corresponding to each wavelength can be determined from power before the multi-wavelength signal is input into the processing apparatus and power after the multi-wavelength signal is output from the processing apparatus, so as to determine, based on a ratio of the power, whether an operating wavelength of each processing subunit matches a design value. Compared with the conventional technology, a quantity of required power detection apparatuses can be greatly reduced. Therefore, costs are reduced and miniaturization of the apparatus is facilitated. In addition, because power used in feedback control (namely, power of an optical signal before entering an optical processing unit) is not affected by a shift of an operating wavelength of a sub-processing device, reliability and accuracy of feedback control of a working status of the optical processing device can be improved.

In an implementation, a dither application unit may be separately configured for each of the N light source units, so that dither signals can be applied to a plurality of light source units in parallel, and duration of feedback control in this application can be reduced.

To be specific, there are N dither application units, the N dither application units one-to-one correspond to the N light source units, and each dither application unit is configured to apply a dither signal to the corresponding light source unit.

Notably, when the dither signals are applied to the plurality of light source units in a same time period, frequencies of the dither signals applied to the plurality of light source units are different.

In this case, in an implementation, the feedback control unit is specifically configured to: perform Fourier transform on the first power signal to obtain N first values, where the N first values one-to-one correspond to frequencies of the N dither signals; perform Fourier transform on the second power signal to obtain N second values, where the N second values one-to-one correspond to the frequencies of the N dither signals; and adjust the working parameter of the $i^{th}$ processing subunit based on a first value and a second value that correspond to an $i^{th}$ dither signal, where the $i^{th}$ dither signal corresponds to the $i^{th}$ single-wavelength signal.

In another implementation, the apparatus further includes at least one first filter unit and at least one second filter unit. The first filter unit is configured to filter the first power signal based on a frequency of the dither signal applied to each single wavelength signal, to obtain N third values, where the N third values one-to-one correspond to the frequencies of the N dither signals. The second filter unit is configured to filter the second power signal based on the frequency of the dither signal applied to each single-wavelength signal, to obtain N fourth values, where the N fourth values one-to-one correspond to the frequencies of the N dither signals. The feedback control unit is specifically configured to adjust the working parameter of the $i^{th}$ processing subunit based on a third value and a fourth value that correspond to the $i^{th}$ dither signal, where the $i^{th}$ dither signal corresponds to the $i^{th}$ single-wavelength signal.

In an implementation, there may be one first filter unit, and the first filter unit separately determines, in a plurality of sub-periods in a same time period, a power value corresponding to each wavelength. To be specific, one first filter unit can be shared in a time division multiplexing mode. Therefore, costs are further reduced.

Similarly, there may be one second filter unit, and the second filter unit separately determines, in a plurality of sub-periods in a same time period, a power value corresponding to each wavelength. To be specific, one second filter unit can be shared in a time division multiplexing mode. Therefore, costs are further reduced.

In another implementation, there are N first filter units and N second filter units. The N first filter units one-to-one correspond to the frequencies of the N dither signals, and each first filter unit is configured to filter the first power signal based on the corresponding frequency of the dither signal. The N second filter units one-to-one correspond to the frequencies of the N dither signals, and each second filter unit is configured to filter the second power signal based on the corresponding frequency of the dither signal.

Therefore, it is determined that the filtering processing can be performed in parallel, and duration of feedback control in this application can be reduced.

In another implementation, the dither signal may be applied in a time division multiplexing mode. To be specific, the N light source units one-to-one correspond to N time periods. The dither application unit is specifically configured to apply a dither signal to an $i^{th}$ light source unit in an $i^{th}$ time period of the N time periods, where the $i^{th}$ light source unit is configured to generate the $i^{th}$ single-wavelength signal. The feedback control unit is specifically configured to adjust the working parameter of the $i^{th}$ processing subunit based on the first power signal obtained by the first detection unit in the $i^{th}$ time period and the second power signal obtained by the second detection unit in the $i^{th}$ time period.

Notably, when the dither signal is applied to each light source unit in different time periods, the dither application unit may be separately configured for each of the N light source units.

Alternatively, one or more dither application units may be configured, and dither signals are applied to at least two light source units by using one dither application unit in a time division multiplexing mode. This can further reduce costs of the apparatus.

In this application, each dither application unit is configured to apply the dither signal to the corresponding light source unit in a first time period. The first detection unit is specifically configured to obtain the first power signal in the first time period. The second detection unit is specifically configured to obtain the second power signal in the first time period, where duration of the first time period is longer than a periodicity of the dither signal.

To be specific, in this application, the first power signal may be a signal obtained by performing power sampling in a specified sampling periodicity, where a length of the sampling period is longer than a periodicity of each dither signal, so as to ensure that power of each wavelength can be reliably obtained in the sampling periodicity.

This application is applicable to feedback control of an optical processing unit including a microring resonator. For example, the optical processing unit includes a modulation unit (or a microring optical modulator), or the optical processing unit includes a third filter unit (or a microring filter), or the optical processing unit includes a dispersion compensation unit (or a microring dispersion compensator).

In this application, the frequency of the dither signal is less than a first threshold, and the first threshold is determined based on a data modulation frequency of the single-wavelength signal. In other words, the modulation frequency of the data signal is made to be far higher than the frequency of the dither signal, so that impact of the data signal on feedback control of this application can be reduced, and crosstalk impact of the dither signal on the data signal can be avoided. Therefore, an effect of this application is further improved.

According to a second aspect, an optical signal processing method is provided. The method is applied to signal processing of a multi-wavelength signal including N wavelengths. The optical signal processing method includes: applying a dither signal to each light source unit of each of the N wavelengths, so that power of a single-wavelength signal generated by the light source unit changes based on the dither signal, where first parameters of any two single-wavelength signals are different, and the first parameter includes at least one of the following parameters: a time period in which the dither signal is applied and a frequency of the applied dither signal; performing wavelength multiplexing processing on the single-wavelength signals to generate the multi-wavelength signal; detecting a first power signal corresponding to the multi-wavelength signal input to an optical processing unit, where the optical processing unit is configured to process the multi-wavelength signal, the optical processing unit includes N processing subunits, the N processing subunits are serially connected, the N processing subunits one-to-one correspond to the N wavelengths, and each processing subunit is configured to process the corresponding wavelength; detecting a second power signal corresponding to a multi-wavelength signal output from the optical processing unit; and adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal, where the $i^{th}$ single-wavelength signal corresponds to the $i^{th}$ processing subunit, and $i \in [1, N]$.

In an implementation, frequencies of dither signals applied to any two single-wavelength signals are different; and the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal includes: performing Fourier transform on the first power signal to obtain N first values, where the N first values one-to-one correspond to frequencies of the N dither signals; performing Fourier transform on the second power signal to obtain N second values, where the N second values one-to-one correspond to the frequencies of the N dither signals; and adjusting the working parameter of the $i^{th}$ processing subunit based on a first value and a second value that correspond to an $i^{th}$ dither signal, where the $i^{th}$ dither signal corresponds to the $i^{th}$ single-wavelength signal.

In another implementation, frequencies of dither signals applied to any two single wavelength signals are different, and the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal includes: filtering the first power signal based on a frequency of the dither signal applied to each single-wavelength signal, to obtain N third values, where the N third values one-to-one correspond to the frequencies of the N dither signals; filtering the second power signal based on the frequency of the dither signal applied to each single-wavelength signal, to obtain N fourth values, where the N fourth values one-to-one correspond to the frequencies of the N dither signals; and adjusting the working parameter of the $i^{th}$ processing subunit based on a third value and a fourth value that correspond to the $i^{th}$ dither signal, where the $i^{th}$ dither signal corresponds to the $i^{th}$ single-wavelength signal.

In still another implementation, the applying a dither signal to each light source unit of each of the N wavelengths includes: applying a dither signal to an $i^{th}$ light source unit in an $i^{th}$ time period of N time periods, where the $i^{th}$ light source unit is configured to generate the $i^{th}$ single-wavelength signal, and the N light source units one-to-one correspond to the N time periods; and the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal includes: adjusting the working parameter of the $i^{th}$ processing subunit based on a first power signal detected in the $i^{th}$ time period and a second power signal detected in the $i^{th}$ time period.

In this application, each processing subunit includes a microring resonator.

For example, the optical processing unit includes an optical modulator, or the optical processing unit includes a filter.

According to a third aspect, an optical signal processing method is provided. The method includes: generating at least one dither signal; and applying the dither signal to each of N light source units, so that power of a single-wavelength signal generated by each light source unit changes based on the dither signal, where the N light source units one-to-one correspond to N wavelengths, each light source unit is configured to generate a single-wavelength signal of the corresponding wavelength, first parameters of any two single-wavelength signals are different, and the first parameter includes at least one of the following parameters: a time period in which the dither signal is applied and a frequency of the applied dither signal.

In an implementation, the method further includes: receiving first information, where the first information indicates a time period in which the dither signal is applied to each single-wavelength signal, and/or the first information indicates a frequency of the dither signal applied to each single-wavelength signal; and the applying the dither signal to each of N light source units includes: applying the dither signal to each of the N light source units based on the first information.

In another implementation, the method further includes: sending second information, where the second information indicates the time period in which the dither signal is applied to each single-wavelength signal, and/or the second information indicates the frequency of the dither signal applied to each single-wavelength signal.

According to a fourth aspect, an optical signal processing method is provided. The method includes: detecting a first power signal corresponding to a multi-wavelength signal input to an optical processing unit, where the optical processing unit is configured to process the multi-wavelength signal, the optical processing unit includes N processing subunits, the N processing subunits are serially connected, the N processing subunits one-to-one correspond to N wavelengths in the multi-wavelength signal, and each processing subunit is configured to process the corresponding wavelength, where the multi-wavelength signal is generated after wavelength multiplexing processing is performed on N single-wavelength signals, the N single-wavelength signals one-to-one correspond to the N wavelengths in the multi-wavelength signal, and power of each single-wavelength signal changes based on a dither signal, where first parameters of any two single-wavelength signals are different, and the first parameter includes at least one of the following parameters: a time period in which the dither signal is applied and a frequency of the applied dither signal; detecting a second power signal corresponding to a multi-wavelength signal output from the optical processing unit; and adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal, where the $i^{th}$ single-wavelength signal corresponds to the $i^{th}$ processing subunit, and $i \in [1, N]$.

In an implementation, frequencies of dither signals applied to any two single-wavelength signals are different; and the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal includes: performing Fourier transform on the first power signal to obtain N first values, where the N first values one-to-one correspond to frequencies of the N dither signals; performing Fourier transform on the second power signal to obtain N second values, where the N second values one-to-one correspond to the frequencies of the N dither signals; and adjusting the working parameter of the $i^{th}$ processing subunit based on a first value and a second value that correspond to an $i^{th}$ dither signal, where the $i^{th}$ dither signal corresponds to the $i^{th}$ single-wavelength signal.

In another implementation, frequencies of dither signals applied to any two single wavelength signals are different, and the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal includes: filtering the first power signal based on a frequency of the dither signal applied to each single-wavelength signal, to obtain N third values, where the N third values one-to-one correspond to the frequencies of the N dither signals; filtering the second power signal based on the frequency of the dither signal applied to each single-wavelength signal, to obtain N fourth values, where the N fourth values one-to-one correspond to the frequencies of the N dither signals; and adjusting the working parameter of the $i^{th}$ processing subunit based on a third value and a fourth value that correspond to the $i^{th}$ dither signal, where the $i^{th}$ dither signal corresponds to the $i^{th}$ single-wavelength signal.

In still another implementation, the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal includes: adjusting the working parameter of the $i^{th}$ processing subunit based on a first power signal detected in an $i^{th}$ time period and a second power signal detected in the $i^{th}$ time period, where the N single-wavelength signals one-to-one correspond to N time periods, an $i^{th}$ single-wavelength signal in the N single-wavelength signals corresponds to the $i^{th}$ time period in the N time periods, and the dither signal is applied to the $i^{th}$ single-wavelength signal in the $i^{th}$ time period.

In an implementation, the method further includes: sending first information, where the first information indicates the time period in which the dither signal is applied to each single-wavelength signal, and/or the first information indicates the frequency of the dither signal applied to each single-wavelength signal.

In another implementation, the method further includes: receiving second information, where the second information indicates the time period in which the dither signal is applied to each single-wavelength signal, and/or the second information indicates the frequency of the dither signal applied to each single-wavelength signal.

According to the solutions provided in the third aspect and the fourth aspect, the solutions can be effectively applicable to a scenario in which the light source unit and the feedback control unit are independently configured.

According to a fifth aspect, a control apparatus is provided. The control apparatus includes modules or units configured to perform the method according to any one of the second aspect to the fourth aspect and any possible implementation of the second aspect to the fourth aspect.

According to a sixth aspect, a control apparatus is provided. The control apparatus includes a processor. The processor is coupled to a memory, and may be configured to perform the method according to any one of the second aspect to the fourth aspect and the possible implementations of the second aspect to the fourth aspect. Optionally, the control apparatus further includes the memory. Optionally, the control apparatus further includes a communication interface, and the processor is coupled to the communication interface.

In an implementation, the control apparatus is a computer device. In this case, the communication interface may be a transceiver or an input/output interface. In another implementation, the control apparatus is a chip or a chip system. In this case, the communication interface may be an input/output interface, an interface circuit, an output circuit, an input circuit, a pin, a related circuit, or the like on the chip or the chip system. The processor may alternatively be embodied as a processing circuit or a logic circuit.

According to a seventh aspect, a control apparatus is provided. The control apparatus includes an input circuit, an output circuit, and a processing circuit. The processing circuit is configured to receive a signal through the input circuit, and transmit the signal through the output circuit, so that the method according to any one of the second aspect to the fourth aspect and any possible implementation of the second aspect to the fourth aspect is implemented.

In a specific implementation process, the control apparatus may be a chip. The input circuit may be an input pin. The output circuit may be an output pin. The processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter and transmitted by the transmitter. In addition, the input circuit and the output circuit may be different circuits, or may be a same circuit. In this case, the circuit is used as the input circuit and the output circuit at different moments. Specific implementations of the processor and the various circuits are not limited in embodiments of this application.

According to an eighth aspect, a control apparatus is provided. The control apparatus includes a processor and a memory. The processor is configured to read instructions stored in the memory, receive a signal through a receiver, and transmit a signal through a transmitter, to perform the method according to any one of the second aspect to the fourth aspect and the possible implementations of the second aspect to the fourth aspect.

Optionally, there are one or more processors, and there are one or more memories.

Optionally, the memory may be integrated with the processor, or the memory and the processor are separately disposed.

During specific implementation, the memory may be a non-transitory (non-transitory) memory, for example, a read-only memory (ROM). The memory and the processor may be integrated on a same chip, or may be separately disposed on different chips. A type of the memory and a manner of disposing the memory and the processor are not limited in embodiments of this application.

It can be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The processor in the eighth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may exist independently outside the processor.

According to a ninth aspect, a computer program product is provided. The computer program product includes: a computer program (which may also be referred to as code or instructions). When the computer program is run, a computer is enabled to perform the method according to any one of the second aspect to the fourth aspect and any possible implementation of the second aspect to the fourth aspect.

According to a tenth aspect, a computer-readable medium is provided. The computer-readable medium stores a computer program (which may also be referred to as code or instructions). When the computer program is run on a computer, the computer is enabled to perform the method according to any one of the second aspect to the fourth aspect and any possible implementation of the second aspect to the fourth aspect.

DESCRIPTION OF EMBODIMENTS

The following describes technical solutions of this application with reference to accompanying drawings.

Figure 1A:
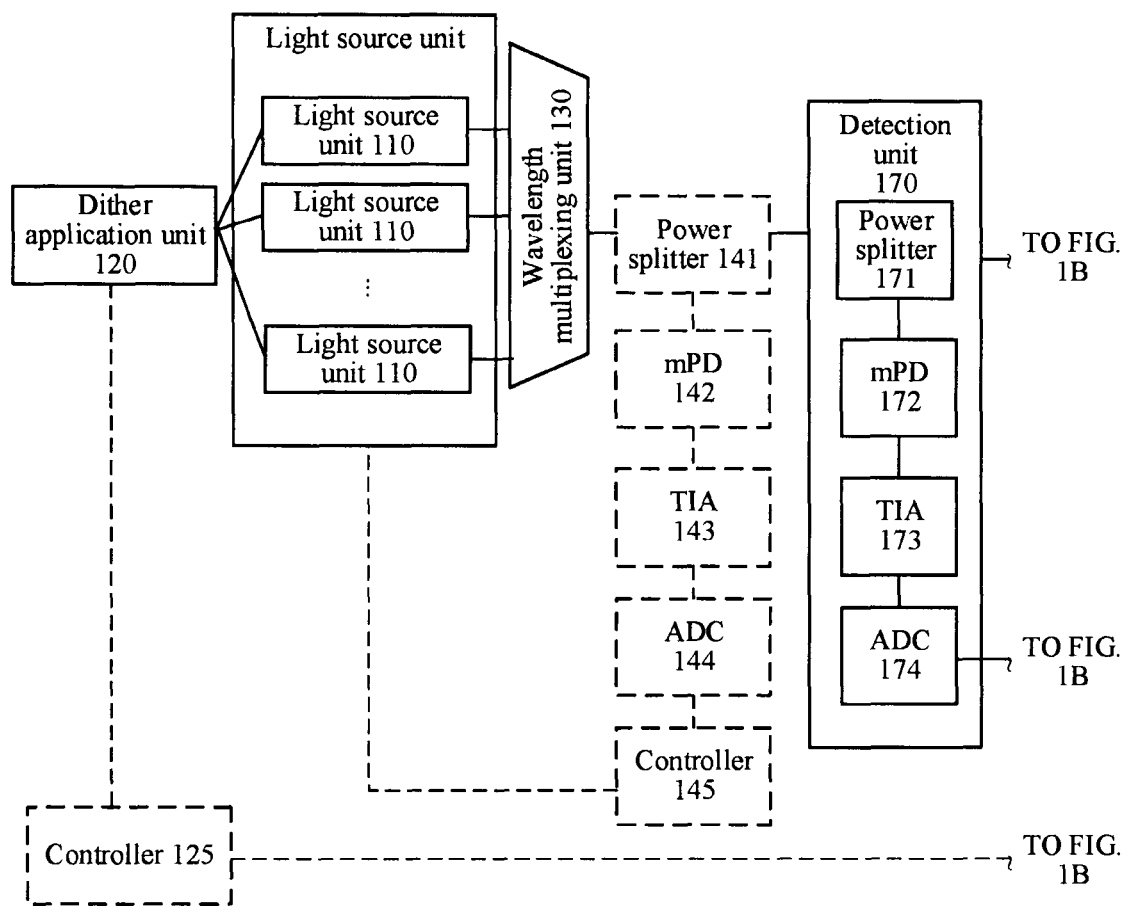
FIG. 1A and FIG. 1B are a schematic diagram of an example of an optical signal processing apparatus according to this application.
Figure 1B:
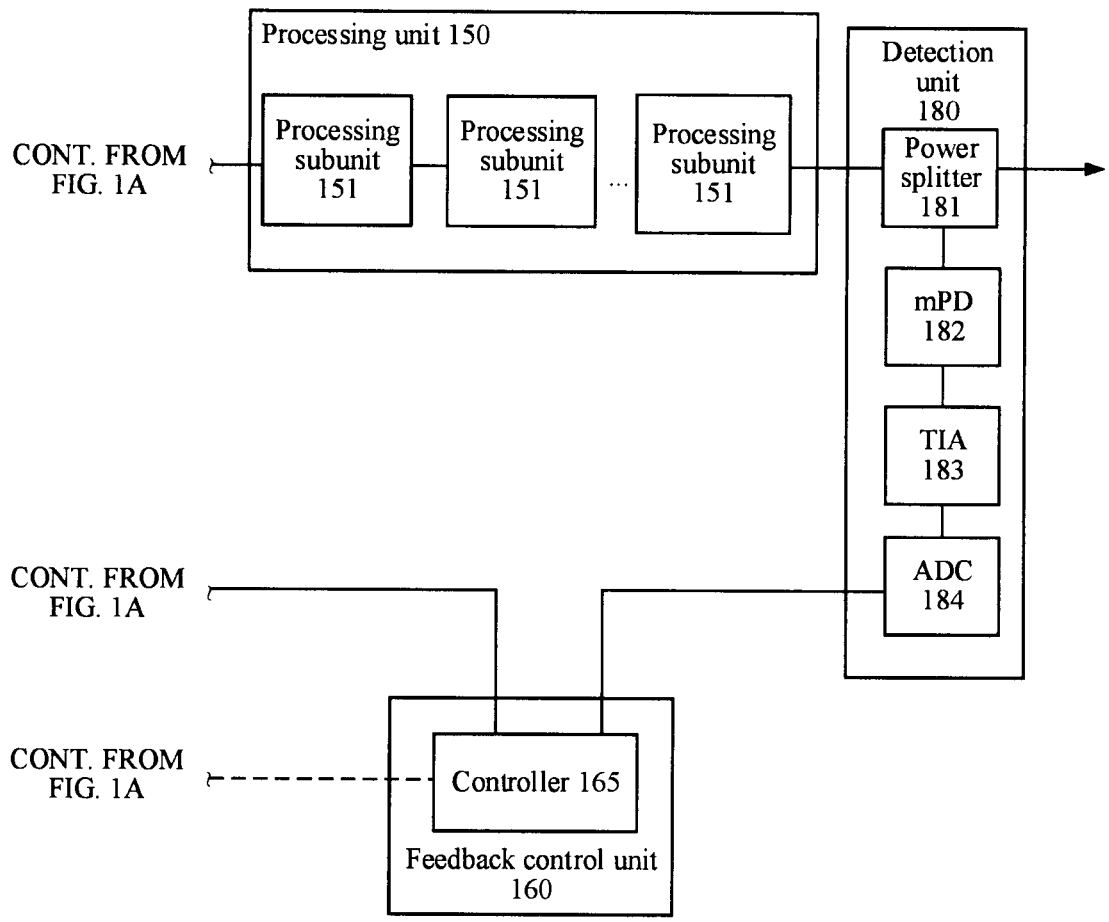

FIG. 1A and FIG. 1B show a structure of an optical signal processing apparatus 100 according to this application. The optical signal processing apparatus may include but is not limited to an optical transmitter, a filter, or the like.

As shown in FIG. 1A and FIG. 1B, the optical signal processing apparatus 100 includes a light source part, a processing part, and a feedback control part. The following separately describes structures and functions of the foregoing parts in detail.

First, the light source part is described.

In this application, the light source part includes the following units, components, or devices.

A. Light Source Unit 110

In this application, there are N light source units 110, and each light source unit 110 is configured to generate a single-wavelength signal. In addition, wavelengths of single-wavelength signals (or single-wavelength optical signals) generated by any two light source units 110 are different. In other words, the N light source units 110 one-to-one correspond to N wavelengths, and each light source unit is configured to generate a single-wavelength signal of the corresponding wavelength. For example, the light source unit may include a laser, and a process in which the light source unit generates a single-wavelength signal may be similar to that in the conventional technology. To avoid repetition, detailed descriptions thereof are omitted herein.

B. Wavelength Multiplexing Unit 130

In this application, the wavelength multiplexing unit 130 is configured to perform wavelength multiplexing processing on N single-wavelength signals (specifically, the following single-wavelength signals each to which a dither signal is applied) to generate a multi-wavelength signal, where the multi-wavelength signal includes N wavelengths (namely, wavelengths of the N single-wavelength signals). In addition, implementations of a structure and a function of the wavelength multiplexing unit 130 may be similar to those in the conventional technology. To avoid repetition, detailed descriptions thereof are omitted herein.

C. Dither Application Unit 120

In this application, the dither application unit 120 is configured to apply a dither signal to each of the N light source units 110; or is configured to apply a dither signal to each of the N single-wavelength signals.

The dither signal has a fixed frequency, so that power of the single-wavelength signal to which the dither signal is applied changes based on a frequency of the dither signal applied to the single-wavelength signal. In other words, power of each wavelength in the multi-wavelength signal changes based on the frequency of the dither signal applied to the single-wavelength signal.

By way of example, and not limitation, a waveform of a power change of the single-wavelength signal (or a waveform of the dither signal) may be a waveform such as a triangular wave, a square wave, or a sine wave.

In this application, the dither signal may be applied to a power supply current of the light source unit (for example, a laser), to implement the foregoing process of applying the dither signal. It can be understood that, the foregoing enumerated method and process of applying the dither signal are merely examples for description, and this application is not limited thereto. The process of applying the dither signal in this application may be similar to a method and a process of applying a dither signal to a device (or a signal) in the conventional technology. To avoid repetition, detailed descriptions thereof are omitted herein.

In this application, the dither signal may be applied in any one of the following manners.

Manner 1

In this application, frequencies of dither signals applied to any two light source units 110 (or any two single-wavelength signals) are different.

To be specific, in this application, there are N frequencies of the applied dither signals, the N frequencies one-to-one correspond to the N single-wavelength signals (or the N light source units 110, or the N wavelengths in the multi-wavelength signal), and the dither signal with the corresponding frequency is applied to each light source unit, or power of each single-wavelength signal changes based on the frequency of the corresponding dither signal, or power of each wavelength in the multi-wavelength signal changes based on the frequency of the corresponding dither signal.

For example, assuming that an $i^{th}$ single-wavelength signal (or a wavelength of the $i^{th}$ single-wavelength signal, or an $i^{th}$ wavelength in the multi-wavelength signal, denoted as $\lambda_i$) in the N single-wavelength signals corresponds to an $i^{th}$ dither signal (or a frequency of the $i^{th}$ dither signal, denoted as $f_i$) in the N dither signals, power corresponding to $\lambda_i$ changes based on $f_i$, where $i \in [1, N]$.

Figure 2:
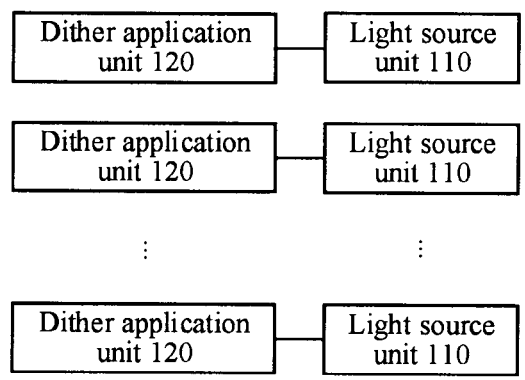
FIG. 2 is a schematic diagram of an example of a dither application unit according to this application.

In an implementation, as shown in FIG. 2, there are N dither application units 120, the N dither application units 120 one-to-one correspond to the N light source units 110 (or the N wavelengths in the multi-wavelength signal), and each dither application unit 120 is configured to apply a dither signal to the corresponding light source unit 110.

In addition, in this case, the N dither application units may apply the dither signals to the N light source units 110 simultaneously (or in parallel).

Manner 2

In this application, time periods in which dither signals are applied to any two light source units 110 (or any two single-wavelength signals) are different.

To be specific, in this application, the N wavelengths (or the N light source units 110) one-to-one correspond to N time periods, and a dither signal is applied to each light source unit 120 in the corresponding time period.

For example, assuming that an $i^{th}$ single-wavelength signal (or a wavelength of the $i^{th}$ single-wavelength signal, or an $i^{th}$ wavelength in the multi-wavelength signal, denoted as $\lambda_i$) in the N single-wavelength signals corresponds to an $i^{th}$ time period in the N time periods, a dither signal is applied to an $i^{th}$ light source unit 110 (namely, a light source unit that generates the $i^{th}$ single-wavelength signal) in the $i^{th}$ time period, or power of $\lambda_i$ changes in the $i^{th}$ time period based on a frequency of the dither signal.

In an implementation, as shown in FIG. 2, there are N dither application units 120, the N dither application units 120 one-to-one correspond to the N light source units 110 (or the N wavelengths in the multi-wavelength signal, or the N time periods), and each dither application unit 120 is configured to apply a dither signal to the corresponding light source unit 110 in the corresponding time period.

Figure 3:
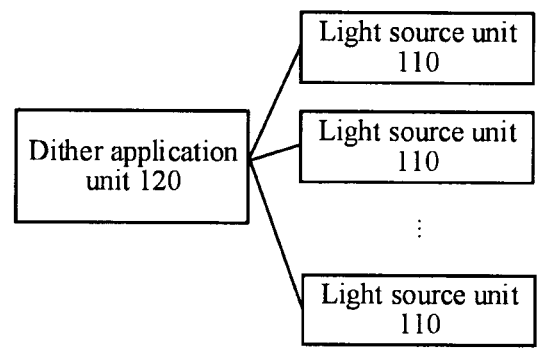
FIG. 3 is a schematic diagram of another example of a dither application unit according to this application.

In another implementation, as shown in FIG. 3, there is one dither application unit 120, configured to separately apply dither signals to the N light source units 110 in the N time periods.

In addition, in this case, the frequencies of the dither signals applied to the wavelengths may be the same.

Manner 3

In this application, frequencies of dither signals applied to any two light source units 110 (or any two single-wavelength signals) are different, and time periods in which dither signals are applied to any two light source units 110 (or any two single-wavelength signals) are different.

To be specific, in this application, there are N frequencies of the applied dither signals, the N frequencies one-to-one correspond to the N single-wavelength signals (or the N light source units 110, or the N wavelengths in the multi-wavelength signal), and the dither signal with the corresponding frequency is applied to each light source unit, or power of each single-wavelength signal changes based on the frequency of the corresponding dither signal, or power of each wavelength in the multi-wavelength signal changes based on the frequency of the corresponding dither signal.

In addition, in this application, the N wavelengths (or the N light source units 110) one-to-one correspond to N time periods, and the dither signal is applied to each light source unit 120 in the corresponding time period.

For example, assuming that an $i^{th}$ single-wavelength signal (or a wavelength of the $i^{th}$ single-wavelength signal, or an $i^{th}$ wavelength in the multi-wavelength signal, denoted as $\lambda_i$) in the N single-wavelength signals corresponds to an $i^{th}$ dither signal (or a frequency of the $i^{th}$ dither signal, denoted as $f_i$) in the N dither signals, and the $i^{th}$ single-wavelength signal (or the wavelength of the $i^{th}$ single-wavelength signal, or the $i^{th}$ wavelength in the multi-wavelength signal, denoted as $\lambda_i$) in the N single-wavelength signals corresponds to an $i^{th}$ time period in the N time periods, power of $\lambda_i$ changes in the $i^{th}$ time period based on $f_i$.

In an implementation, there are N dither application units 120, the N dither application units 120 one-to-one correspond to the N light source units 110 (or the N wavelengths in the multi-wavelength signal), and each dither application unit 120 is configured to apply a dither signal to the corresponding light source unit 110.

In another implementation, there is one dither application unit 120, the one dither application unit 120 is configured to separately apply the dither signals with different frequencies to the N light source units 110 in the N time periods.

Notably, amplitudes of the dither signals applied to the wavelengths may be the same or different. This is not particularly limited in this application.

When the amplitudes of the dither signals applied to the wavelengths are different, a feedback control unit 160 described below (for example, a controller 165 in the feedback control unit 160) may further distinguish power corresponding to each wavelength in power in the multi-wavelength signal based on the amplitudes of the dither signals applied to the wavelengths, so as to further improve an effect of this application. Subsequently, a method and a process of determining the power corresponding to each wavelength by the feedback control unit are described in detail.

By way of example, and not limitation, for example, a parameter (for example, one or more of a time period in which the dither signal is applied, a frequency of the applied dither signal, and an amplitude of the applied dither signal) of the dither signal applied by the dither application unit 120 to each light source unit 110 may be manually set.

For another example, the light source part may further include a controller 125.

The controller 125 is configured to control the dither application unit 120 to apply a dither signal to the light source unit 110, for example, control a parameter of the dither signal.

In an implementation, the controller 125 may send a parameter of a dither signal corresponding to each wavelength to the controller 165, so that the controller 165 determines power of each wavelength based on the parameter of the dither signal corresponding to each wavelength.

In another implementation, the controller 165 may send a parameter of a dither signal corresponding to each wavelength to the controller 125, so that the controller 125 may apply the dither signal based on the parameter.

By way of example, and not limitation, the light source part may further include a monitor component 140.

The monitor component 140 is configured to detect power of the multi-wavelength signal, and control each light source unit 110 based on the detected power. A method and a process of generating a laser of each wavelength in the multi-wavelength signal based on power control of the multi-wavelength signal may be similar to those in the conventional technology. To avoid repetition, detailed descriptions thereof are omitted herein.

For example, the monitor component may include but is not limited to a power splitter 141, a monitor photodiode (mPD) 142, a trans-impedance amplifier (TIA) 143, an analog-to-digital converter 144, and a controller 145.

The power splitter 141 is configured to split a specific percentage (for example, 10%) of signals (referred to as monitor signals) from the multi-wavelength signal. The monitor photodiode 142 generates, based on the monitor signals, electrical signals corresponding to power of the monitor signals, the trans-impedance amplifier 143 amplifies the electrical signals, and the analog-to-digital converter 144 performs analog-to-digital conversion on the amplified electrical signals to generate digital signals, so that the controller 145 can obtain the digital signals indicating the power of the multi-wavelength signal, and control an optical signal generation process of the light source unit 110 based on the power of the multi-wavelength signal indicated by the digital signal.

The controller 145 and the controller 125 may be a same controller (or functions of the two are implemented by a same physical device), or the controller 145 and the controller 125 may be independently configured. This is not particularly limited in this application.

It can be understood that, the foregoing enumerated specific devices included in the monitor component are merely examples for description, and this application is not limited thereto. A structure of the monitor component in this application may be similar to a structure of any device that can be used to determine an optical signal in the conventional technology.

The processing part is described below.

The processing part may also be referred to as a processing unit 150, and the processing unit includes N processing subunits 155.

The N processing subunits 155 one-to-one correspond to the foregoing N wavelengths (in the multi-wavelength signal), and each processing subunit 155 is configured to process the corresponding wavelength.

In this application, the N processing subunits 155 are serially connected, or the N processing subunits 155 separately process N wavelengths in a multi-wavelength signal transmitted through a same optical fiber.

In an implementation, the processing unit includes an optical modulator. To be specific, the N processing subunits 155 are N optical modulators.

The optical modulator converts an input electrical signal into an optical signal, and uses a coupling technology to inject the optical signal into an optical fiber line to a maximum extent. The process of converting the electrical signal into the optical signal is optical modulation. The modulator in this application may include but is not limited to an acousto-optic modulator, a magneto-optic modulator, an electro-optic modulator, an electro-absorption modulator, or the like.

The electro-optic modulator implements optical modulation by using a refractive index of an electro-optic crystal (for example, lithium niobate) that changes with an external electric field, namely, an electro-optic effect, to be specific, the electro-optic modulator finally regulates a refractive index, an absorption rate, an amplitude, or a phase of output light by using a change of a voltage or the electric field. By way of example, and not limitation, in this application, the electro-optic modulator may be, for example, a microring modulator.

The magneto-optic modulator implements optical modulation when a plane of polarization of the magneto-optic modulator is rotated under the action of a magnetic field when light passes through a magneto-optic crystal (for example, yttrium iron garnet). The acousto-optic modulator uses a material (for example, lithium niobate) to generate a strain under a sound wave to cause a refractive index change, namely, a photoelastic effect, so as to implement optical modulation. A waveguide optical modulator is a thin-film optical waveguide made on a substrate by using an integrated optical technology to implement electro-optic, magneto-optic, or acousto-optic modulation.

In this application, the modulator has an operating wavelength, to be specific, the modulator can modulate data onto a light beam whose wavelength matches (for example, the same as) the operating wavelength of the modulator.

Figure 4:
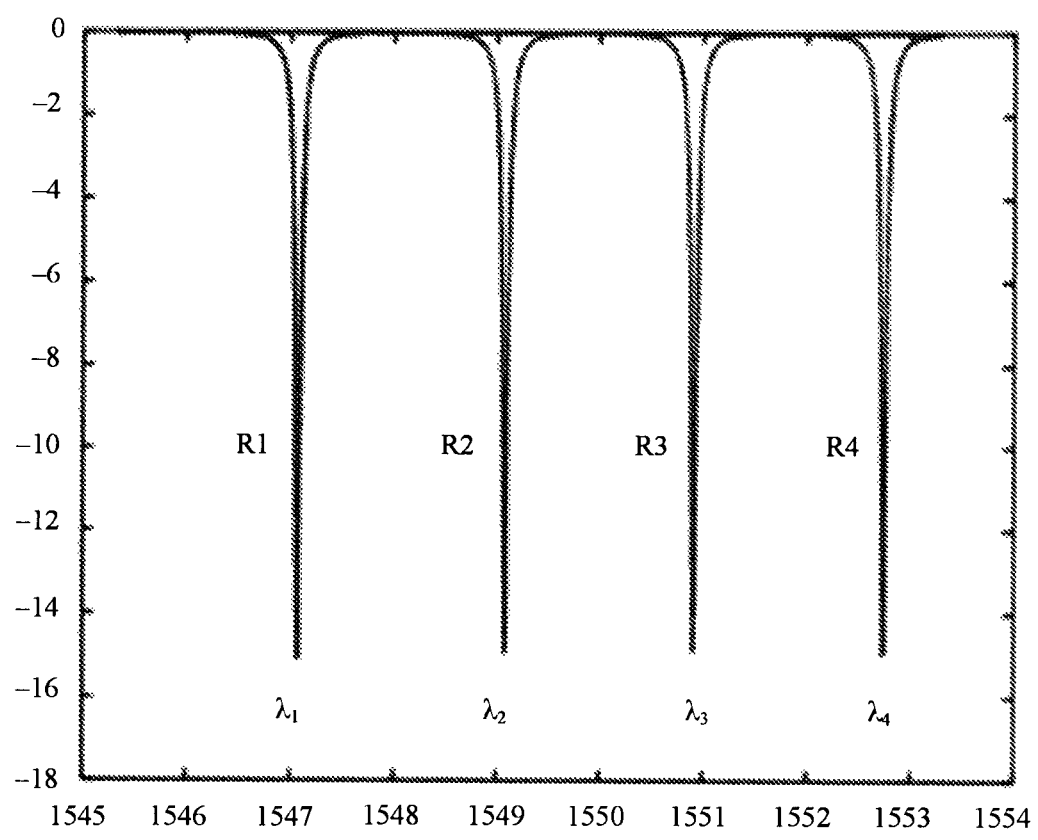
FIG. 4 is a schematic diagram of an example of output spectrums of a plurality of sub-modulators in an optical modulator.

FIG. 4 is a schematic diagram of a spectrum of an output optical signal (namely, a modulated optical signal) of a modulator. As shown in FIG. 4, for example, when a microring modulator is used as a modulator in this application, an optical signal output by each modulator has a resonance peak. An operating wavelength of the modulator is set near the resonance peak, for example, a side wall of the resonance peak. Therefore, if a wavelength of a light beam input to a modulator (for example, a microring modulator) does not satisfy an operating wavelength condition, the modulator does not modulate data onto the light beam.

It can be understood that the manner of setting the operating wavelength shown in FIG. 4 is merely an example for description, and this application is not limited thereto. An operating wavelength of a modulator may correspondingly change based on a type of the modulator.

In an implementation, an operating state of the modulator (or the operating wavelength of the modulator) may be adjusted, so that the operating wavelength of the modulator matches a wavelength of an input light beam. Therefore, the input light beam is modulated.

By way of example, and not limitation, an effective refractive index of a waveguide of a modulator (for example, a microring modulator or an MZI modulator) may be changed by using a thermo-optical effect, so as to change the operating wavelength of the modulator.

In another implementation, the processing unit includes a filter, to be specific, the N processing subunits 155 are N filters. Similar to that the processing subunit is the modulator, when the processing subunit is the filter, each filter has an operating wavelength, and each filter is configured to enable a wavelength, in the multi-wavelength signal, that matches the operating wavelength of the filter to pass through (or filter out a wavelength other than the wavelength, in the multi-wavelength signal, that matches the operating wavelength of the filter). Alternatively, each filter is configured to filter out the wavelength that matches the operating wavelength of the filter from the multi-wavelength signal.

In still another implementation, the processing unit includes a dispersion compensator, to be specific, the N processing subunits 155 are N dispersion compensators. Similar to that the processing subunit is the modulator or the filter, when the processing subunit is the dispersion compensator, each dispersion compensator has an operating wavelength, and each dispersion compensator is configured to perform dispersion compensation on a wavelength, in the multi-wavelength signal, that matches the operating wavelength of the dispersion compensator. The dispersion compensator is a device or an apparatus configured to compensate for dispersion generated in a transmission medium. The dispersion compensator in this application may include but is not limited to a serially connected narrowband fiber grating dispersion compensator, a sampling fiber grating dispersion compensator, and a low-crosstalk fiber grating dispersion compensator.

For ease of understanding and description, the following describes the solution of this application by using an example in which an optical modulator is used as a processing subunit.

In optical communication technologies, an optical transmitter is a device configured to modulate information carried by an electrical signal into a laser signal and propagate the laser signal in an optical fiber. The optical modulator is a core device of the optical transmitter, and is a device that implements optical-to-electrical signal conversion in conversion of data information from an electrical signal to an optical signal. An output response function T of the optical signal changes based on a loaded voltage. When a high-speed data electrical signal V(f) with 0/1-bit information is loaded to the optical modulator, a continuous wave E0 (CW) laser signal that passes through the optical modulator is modulated by an output response function T(f) determined by V(f). The optical signal output by the optical modulator is E0T(f). In this specification, unless otherwise specified, a high-speed data signal refers to a high-speed electrical modulation signal that is loaded to the optical modulator and that carries data information.

Figure 5:
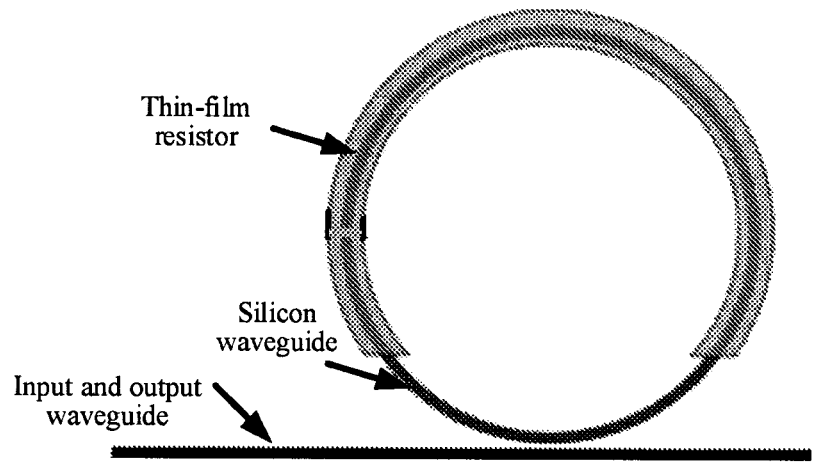
FIG. 5 is a schematic diagram of an example of an optical signal processing device having a microring resonator according to this application.

FIG. 5 is a schematic diagram of a microring modulator. The microring modulator is a type of the optical modulator. As shown in FIG. 5, the microring resonator (Microring Resonator, MRR) is a ring waveguide placed close to an output waveguide (Bus). An optical signal E input to the bus waveguide is partially coupled to the MRR when being transmitted close to the MRR. After an optical signal $E_{MRR}$ encircles the MRR, the optical signal $E_{MRR}$ is partially coupled back to the bus waveguide when being transmitted close to the bus waveguide, and interferes with an optical signal E' in the bus waveguide. If a phase difference between the $E_{MRR}$ and the part of the $E_{MRR}$ that is coupled back to the bus waveguide satisfies a specific condition, destructive interference occurs. This reduces an output optical signal Et. A wavelength that satisfies a destruction condition is referred to as a resonance wavelength $\lambda_{res}$ (corresponding to the MRR).

When a waveguide is manufactured by using an electro-optic material or a material with ion doping, a refraction coefficient neff of the waveguide changes with a voltage applied to the waveguide. For an MRR manufactured by using this waveguide, a resonance wavelength of the MRR changes with a loaded voltage. If a CW optical signal whose wavelength is $\lambda_0$ is input to the waveguide, and a high-speed data modulation signal V(f) is loaded to the MRR, a loss caused because the optical signal whose wavelength is $\lambda_0$ passes through the MRR changes with a voltage, so that power of an output optical signal changes and carries modulation signal information. Therefore, an optical modulator function is implemented.

It can be learned that, to modulate the CW optical signal whose wavelength is $\lambda_0$, a resonant wavelength (or an operating wavelength) of the microring modulator needs to be maintained at a designed target wavelength $\lambda_{res}$. However, in practice, due to an error of a manufacturing process, an operating wavelength of the MRR may deviate from a target wavelength. In addition, because the waveguide material further has a thermo-optic characteristic, when an operating temperature changes, a waveguide refraction coefficient changes, and the operating wavelength of the microring modulator MRR deviates from the target wavelength.

The solution provided in this application can be effectively used to detect whether an operating wavelength of the microring resonator deviates from a target wavelength.

The feedback control part is described below.

The feedback control part includes the following units, components, or devices:

D. Detection Unit 170

The detection unit 170 is configured to detect power (denoted as P1) of a multi-wavelength signal (denoted as a multi-wavelength signal #A below for ease of understanding and description) output from the wavelength multiplexing unit 130 (or the power splitter 141); or the detection unit 170 is configured to detect power P1 of a multi-wavelength optical signal (namely, the multi-wavelength signal #A) input to the processing unit 150 (specifically, the first (in a sequence of an optical signal flow direction) processing subunit 155 in the processing unit 150).

For example, the detection unit 170 may include but is not limited to a power splitter 171, a monitor photodiode (mPD) 172, a trans-impedance amplifier (TIA) 173, and an analog-to-digital converter 174.

The power splitter 171 is configured to split a specific percentage (for example, 10%) of signals (referred to as feedback signals #A) from the multi-wavelength signal #A. The monitor photodiode 172 generates, based on the feedback signals #A, electrical signals (denoted as electrical signals #A) corresponding to power of the feedback signals #A, the trans-impedance amplifier 173 amplifies the electrical signals #A, and the analog-to-digital converter 174 performs analog-to-digital conversion on the amplified electrical signals #A to generate digital signals (denoted as digital signals #A), to be specific, the digital signals #A indicates the power P1 of the multi-wavelength signal #A.

It can be understood that, the foregoing enumerated specific devices included in the detection unit 170 are merely examples for description, and this application is not limited thereto. A structure of the detection unit 170 in this application may be similar to a structure of any device that can be used to determine an optical signal in the conventional technology.

E. Detection Unit 180

The detection unit 180 is configured to detect power (denoted as P2) of a multi-wavelength signal (denoted as a multi-wavelength signal #B below for ease of understanding and description) output from the processing unit 150 (specifically, the last (in a sequence of the optical signal flow direction) processing subunit 155 in the processing unit 150); or the detection unit 180 is configured to detect power P2 of a multi-wavelength optical signal (for example, a modulated multi-wavelength signal) output from the optical signal processing apparatus 100 in this application.

For example, the detection unit 180 may include but is not limited to a power splitter 181, a monitor photodiode (mPD) 182, a trans-impedance amplifier (TIA) 183, and an analog-to-digital converter 184.

The power splitter 181 is configured to split a specific percentage (for example, 10%) of signals (referred to as feedback signals #B) from the multi-wavelength signal #B. The monitor photodiode 182 generates, based on the feedback signals #B, electrical signals (denoted as electrical signals #B) corresponding to power of the feedback signals #B, the trans-impedance amplifier 183 amplifies the electrical signals #B, and the analog-to-digital converter 184 performs analog-to-digital conversion on the amplified electrical signals #B to generate digital signals (denoted as digital signals #B), to be specific, the digital signals #B indicate the power P1 of the multi-wavelength signal #B.

It can be understood that, the foregoing enumerated specific devices included in the detection unit 180 are merely examples for description, and this application is not limited thereto. A structure of the detection unit 180 in this application may be similar to a structure of any device that can be used to determine an optical signal in the conventional technology.

F. Feedback Control Unit 160

The feedback control unit 160 includes the controller 165.

The controller 165 is in a communication connection with the detection unit 170, and can obtain the digital signal #A from the detection unit 170, so as to determine the power P1 of the multi-wavelength signal #A.

The controller 165 is in a communication connection with the detection unit 180, and can obtain the digital signal #B from the detection unit 180, so as to determine the power P2 of the multi-wavelength signal #B.

In addition, the controller 165 can obtain a parameter of a dither signal corresponding to each wavelength in the multi-wavelength signal (for example, one or more of a time period in which the dither signal is applied, a frequency of the applied dither signal, and an amplitude of the applied dither signal).

By way of example, and not limitation, for example, the parameters of the dither signals corresponding to the wavelengths may be manually input to the controller 165.

For another example, the parameters of the dither signals corresponding to the wavelengths may be determined by the controller 125, and the controller 125 may send the parameter of the dither signal corresponding to each wavelength to the controller 165.

In another implementation, the parameters of the dither signals corresponding to the wavelengths may be determined by the controller 165, and the controller 165 may send the parameter of the dither signal corresponding to each wavelength to the controller 125, so that the controller 125 may apply the dither signal based on the parameter.

In an implementation, the light source part and the feedback control part may be configured in a same physical device (in other words, geographical locations of the light source part and the feedback control part may be the same), one controller in the physical device can be in a communication connection with the dither application unit 120, and the controller can be in a communication connection with the detection unit 170 and the detection unit 180. In this case, the controller may implement functions of the controller 125 and the controller 165. In other words, the controller 125 and the controller 165 may be a same controller.

In an implementation, the light source part and the feedback control part may be configured in different physical devices (in other words, geographical locations of the light source part and the feedback control part may be different). In this case, there is a communication connection (for example, a wired connection or a wireless connection) between the controller 125 and the controller 165 for transmitting the parameter of the dither signal.

In this application, the controller 165 can determine, based on the obtained P1, P2, and the parameters of the dither signals corresponding to the wavelengths, whether an operating wavelength of each processing subunit 155 deviates from a target wavelength (for example, a deviation between the two is greater than or equal to a preset first threshold). When it is determined that the operating wavelength of each processing subunit 155 deviates from the target wavelength, corresponding adjustment is performed to enable the operating wavelength of each processing subunit 155 matches the target wavelength (for example, the deviation between the two is less than or equal to a preset second threshold).

Specifically, P1 may be represented by using the following formula 1:

$$P_1 = IL \times \left( \sum_{i=1}^{N} P_{i,dither} \times \sin(2\pi f_i t) + \sum_{i=1}^{N} P_{i,DC} \right) \quad \text{Formula 1}$$

IL represents a loss in a transmission process of the multi-wavelength signal from the light source part to the processing part, $P_{i,dither} \times \sin(2\pi f_i t)$ represents power of a dither signal corresponding to an $i^{th}$ wavelength $\lambda_i$, $P_{i,dither}$ represents an amplitude of the dither signal corresponding to the $i^{th}$ wavelength $\lambda_i$, $f_i$ represents a frequency of the dither signal corresponding to the $i^{th}$ wavelength, and $P_{i,DC}$ represents average transmit power of a light source unit corresponding to the $i^{th}$ wavelength $\lambda_i$.

P2 may be represented by using the following formula 2:

$$P_2 = IL \times \left( \sum_{i=1}^{N} MOD_i \times P_{i,dither} \times \sin(2\pi f_i t) + \sum_{i=1}^{N} MOD_i \times P_{i,DC} \right) \quad \text{Formula 2}$$

$MOD_i$ represents a loss caused after the $i^{th}$ wavelength $\lambda_i$ is processed by a processing subunit (for example, a microring optical modulator) corresponding to the $i^{th}$ wavelength $\lambda_i$.

$MOD_i$ may also be referred to as a modulation penalty, and a specific value of $MOD_i$ is a ratio of input power to output power, and therefore is irrelevant to a specific value of the input power. In other words, the specific value of $MOD_i$ is determined by a relative position between an operating wavelength of the microring resonator and the input wavelength.

It can be learned based on the foregoing formula that, if power $P1_i$ corresponding to the $i^{th}$ wavelength in P1 and power $P2_i$ corresponding to the $i^{th}$ wavelength in P2 can be determined, a ratio of $P1_i$ to $P2_i$ may be determined as $MOD_i$.

Notably, in an actual process, P1 and P2 further include a power change caused by loading a high-speed data signal by the microring modulator to an optical signal. However, because a frequency of the high-speed data signal is generally greater than 10 GHz, by making the frequency of the dither signal far less than the frequency of the high-speed data signal, impact of the power change caused by loading the high-speed data signal by the microring modulator to the optical signal on P1 and P2 can be ignored. For example, the frequency of the dither signal may be at an order of magnitude of tens of kHz or hundreds of kHz, to be specific, the power change caused by the dither signal forms a slow-varying envelope relative to the power change caused by loading the high-speed data signal. In this way, the power change caused by the dither signal can be easily distinguished in frequency domain space.

In an implementation, the high-speed data signal may be filtered out from a multi-wavelength signal output by the mPD through a low-pass filter.

The following describes a process in which the controller 165 determines the power $P1_i$ corresponding to the $i^{th}$ wavelength $\lambda_i$ in P1 and the power $P2_i$ corresponding to the $i^{th}$ wavelength $\lambda_i$ in P2.

In this application, the controller 165 may determine, based on any one of the following manners, the power $P1_i$ corresponding to the $i^{th}$ wavelength $\lambda_i$ in P1 and the power $P2_i$ corresponding to the $i^{th}$ wavelength $\lambda_i$ in P2.

Manner A

Specifically, when the dither application unit applies the dither signal based on the foregoing manner 1, frequencies of the dither signals corresponding to the wavelengths are different.

In this case, the controller 165 may sample the digital signal #A to obtain a data set #A, and a relationship between data in the data set #A is a function of the frequency of each dither signal.

Notably, in order that the data set #A obtained through sampling includes data corresponding to each wavelength, it needs to be ensured that sampling duration is longer than a periodicity of the dither signal corresponding to each wavelength.

Fourier transform is performed on the data set #A (or the data in the data set #A), so that a value corresponding to the frequency of each dither signal can be obtained. In this case, a value corresponding to the frequency $f_i$ may represent the dither amplitude $P1_{i, dither}$ of the power corresponding to the wavelength $\lambda_i$ corresponding to the dither signal whose frequency is $f_i$.

The controller 165 may determine, based on a manual configuration, a correspondence between the frequency $f_i$ of the $i^{th}$ dither signal and the $i^{th}$ wavelength $\lambda_i$.

Alternatively, the controller 165 may obtain, from the controller 125, a correspondence between the frequency $f_i$ of the $i^{th}$ dither signal and the $i^{th}$ wavelength $\lambda_i$.

Alternatively, the controller 165 may determine a correspondence between the frequency $f_i$ of the $i^{th}$ dither signal and the $i^{th}$ wavelength $\lambda_i$, and send the correspondence to the controller 125.

Similarly, in this case, the controller 165 may sample the digital signal #B to obtain a data set #B, and a relationship between data in the data set #B is a function of the frequency of each dither signal.

Notably, in order that the data set #B obtained through sampling includes data corresponding to each wavelength, it needs to be ensured that sampling duration is longer than the periodicity of the dither signal corresponding to each wavelength.

Fourier transform is performed on the data set #B (or the data in the data set #B), so that a value corresponding to the frequency of each dither signal can be obtained. In this case, a value corresponding to the frequency $f_i$ may represent the dither amplitude $P2_{i, dither}$ of the power corresponding to the wavelength $\lambda_i$ corresponding to the dither signal whose frequency is $f_i$.

Manner B

Specifically, when the dither application unit applies the dither signal based on the foregoing manner 1, frequencies of the dither signals corresponding to the wavelengths are different.

Figure 6A:
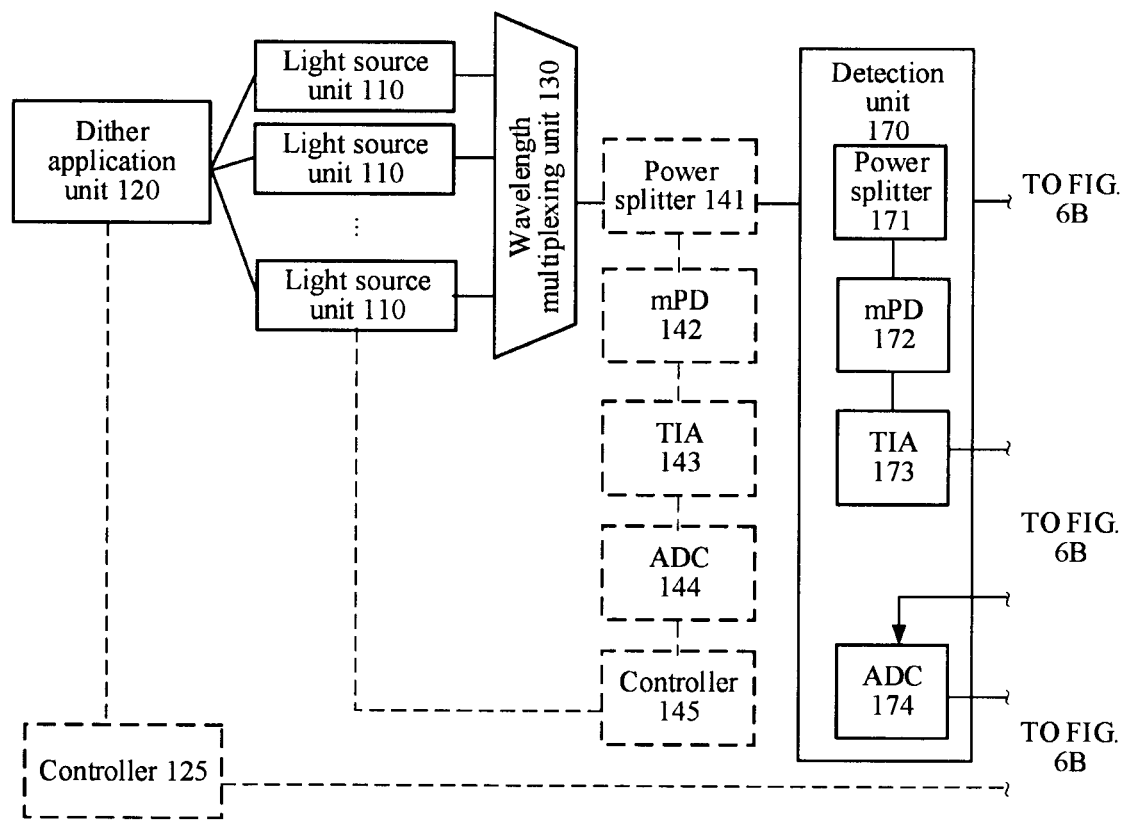
FIG. 6A and FIG. 6B are a schematic diagram of another example of an optical signal processing apparatus according to this application.
Figure 6B:
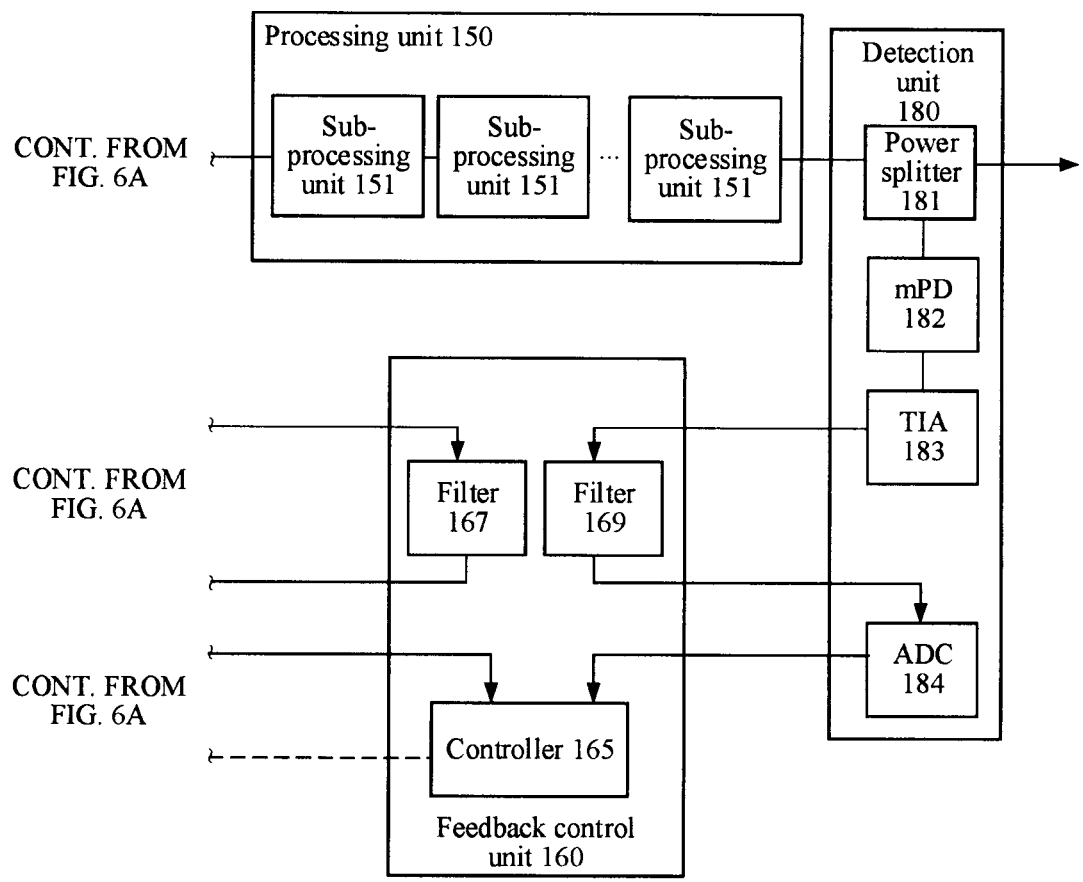

In this case, as shown in FIG. 6B, a filter 167 and a filter 169 may be further configured in the feedback control part.

The filter 167 filters the electrical signal #A to determine a component corresponding to each dither signal (specifically, the frequency of each dither signal) in the electrical signal #A.

For example, when a component corresponding to the dither signal whose frequency is $f_i$ in the electrical signal #A needs to be determined, the filter 167 may be controlled to allow a part with the frequency of $f_i$ in the electrical signal #A to pass through. To be specific, a part other than the part with the frequency of $f_i$ is filtered out, so that a value corresponding to the part with the frequency of $f_i$ (for example, a value indicated by a signal generated after analog-to-digital conversion) may represent the dither amplitude $P1_{i, dither}$ of the power corresponding to the wavelength $\lambda_i$ corresponding to the dither signal whose frequency is $f_i$.

In an implementation, as shown in FIG. 6B, there may be N filters 167, the N filters 167 one-to-one correspond to N wavelengths (or N dither signal frequencies), and each filter is configured to obtain a power value of the corresponding wavelength.

Alternatively, there may be one filter 167, and the filter 167 is controlled to separately obtain power values of different wavelengths in different time periods.

Similarly, the filter 169 filters the electrical signal #B to determine a component corresponding to each dither signal (specifically, the frequency of each dither signal) in the electrical signal #B.

For example, when a component corresponding to the dither signal whose frequency is $f_i$ in the electrical signal #B needs to be determined, the filter 169 may be controlled to allow a part with the frequency of $f_i$ in the electrical signal #B to pass through. To be specific, a part other than the part with the frequency of $f_i$ is filtered out, so that a value corresponding to the part with the frequency of $f_i$ (for example, a value indicated by a signal generated after analog-to-digital conversion) may represent the dither amplitude $P2_{i, dither}$ of the power corresponding to the wavelength $\lambda_i$ corresponding to the dither signal whose frequency is $f_i$.

In an implementation, as shown in FIG. 6B, there may be N control filters 169, the N filters 169 one-to-one correspond to N wavelengths (or N dither signal frequencies), and each filter is configured to obtain a power value of the corresponding wavelength.

Alternatively, there may be one filter 169, and the filter 169 is controlled to separately obtain power values of different wavelengths in different time periods.

For example, the controller 165 may control working parameters (for example, operating wavelengths) of the filter 167 and the filter 169, so that the filter 167 and the filter 169 complete the foregoing functions.

Alternatively, the working parameters of the filter 167 and the filter 169 may be manually configured. This is not specifically limited in this application.

Therefore, the controller 165 may obtain $P1_{i, dither}$ and $P2_{i, dither}$ from the filter 167 and the filter 169.

Manner C

Specifically, when the dither application unit applies the dither signal based on the foregoing manner 2, time periods in which the dither signal is applied to each wavelength are different.

In this case, the controller 165 may determine that power indicated by a digital signal #A obtained in the $i^{th}$ time period is the dither amplitude $P1_{i, dither}$ of the power corresponding to the wavelength $\lambda_i$.

In addition, the controller 165 may determine that power indicated by a digital signal #B obtained in the $i^{th}$ time period is the dither amplitude $P2_{i, dither}$ of the power corresponding to the wavelength $\lambda_i$.

The controller 165 may determine, based on a manual configuration, a correspondence between the $i^{th}$ time period and the $i^{th}$ wavelength $\lambda_i$.

Alternatively, the controller 165 may obtain, from the controller 125, a correspondence between the $i^{th}$ time period and the $i^{th}$ wavelength $\lambda_i$.

Alternatively, the controller 165 may determine a correspondence between the $i^{th}$ time period and the $i^{th}$ wavelength $\lambda_i$, and send the correspondence to the controller 125.

Manner D

Specifically, when the dither application unit applies the dither signal based on the foregoing manner 3, time periods in which the dither signal is applied to each wavelength are different, and frequencies of the dither signal applied to each wavelength are different.

In this case, the controller 165 may sample a digital signal #A obtained in the $i^{th}$ time period to obtain a data set #$A_i$, and a relationship between data in the data set #$A_i$ is a function of the frequency of the $i^{th}$ dither signal.

Notably, in order that the data set #$A_i$ obtained through sampling includes data corresponding to the $i^{th}$ wavelength, it needs to be ensured that sampling duration is longer than a periodicity of the dither signal corresponding to the $i^{th}$ wavelength.

Fourier transform is performed on the data set #$A_i$ (or the data in the data set #$A_i$), a value corresponding to the frequency $f_i$ of the $i^{th}$ dither signal can be obtained. In this case, the value corresponding to the frequency $f_i$ may represent the dither amplitude $P1_{i, dither}$ of the power corresponding to the wavelength $\lambda_i$ corresponding to the dither signal whose frequency is $f_i$.

Similarly, the controller 165 may sample a digital signal #B obtained in the $i^{th}$ time period to obtain a data set #$B_i$, and a relationship between data in the data set #$B_i$ is a function of the frequency of the $i^{th}$ dither signal.

Notably, in order that the data set #$B_i$ obtained through sampling includes data corresponding to the $i^{th}$ wavelength, it needs to be ensured that sampling duration is longer than the periodicity of the dither signal corresponding to the $i^{th}$ wavelength.

Fourier transform is performed on the data set #$B_i$ (or the data in the data set #$B_i$), a value corresponding to the frequency $f_i$ of the $i^{th}$ dither signal can be obtained. In this case, the value corresponding to the frequency $f_i$ may represent the dither amplitude $P2_{i, dither}$ of the power corresponding to the wavelength $\lambda_i$ corresponding to the dither signal whose frequency is $f_i$.

After determining the power $P1_i$ corresponding to the $i^{th}$ wavelength $\lambda_i$ in P1 and the power $P2_i$ corresponding to the $i^{th}$ wavelength $\lambda_i$ in P2 as described above, the controller 165 may determine $MOD_i$ based on the following formula 3:

$$MOD_i = P1_{i, dither} / P2_{i, dither}$$

Further, the controller 165 adjusts a working parameter of an $i^{th}$ processing subunit based on $MOD_i$. For example, the controller 165 may heat a microring waveguide by using a thin-film resistor integrated on a chip of the processing subunit, so that an operating wavelength of the processing subunit matches a target wavelength. In this case, a voltage applied to the chip may be adjusted based on $MOD_i$, so as to adjust a heating temperature.

In this application, a refractive index of an optical device of the processing subunit may be changed by changing a manner of applying a voltage, so as to change a resonance wavelength of the processing subunit.

For example, in a processing subunit based on a thermo-optic effect, a refractive index can be increased by increasing a voltage, so as to increase a resonance wavelength; or a refractive index can be decreased by decreasing the voltage, so as to decrease a resonance wavelength.

For another example, in a processing subunit based on an electro-optic effect of ion doping, ion distribution is changed by increasing a voltage, so that a refractive index can be decreased and a resonance wavelength can be decreased; or ion distribution is changed by increasing a voltage, so that a refractive index can be increased and a resonance wavelength can be increased.

For another example, in a processing subunit based on an electro-optic effect of a non-linear effect, the refractive index can be increased by increasing the voltage, so as to increase the resonance wavelength; or the refractive index can be decreased by decreasing the voltage, so as to decrease the resonance wavelength.

Therefore, in this application, if $MOD_i$ is greater than $MOD_i'$, the applied voltage may be adjusted based on the foregoing relationship to reduce the refractive index until a deviation between $MOD_i$ and $MOD_i'$ is within a preset range. $MOD_i'$ represents a ratio of power of an input signal to power of an output signal of the processing subunit when the operating wavelength of the $i^{th}$ processing subunit matches the target wavelength.

In addition, if $MOD_i$ is less than $MOD_i'$, the applied voltage may be adjusted based on the foregoing relationship to increase the refractive index until the deviation between $MOD_i$ and $MOD_i'$ is within the preset range.

Figure 7:
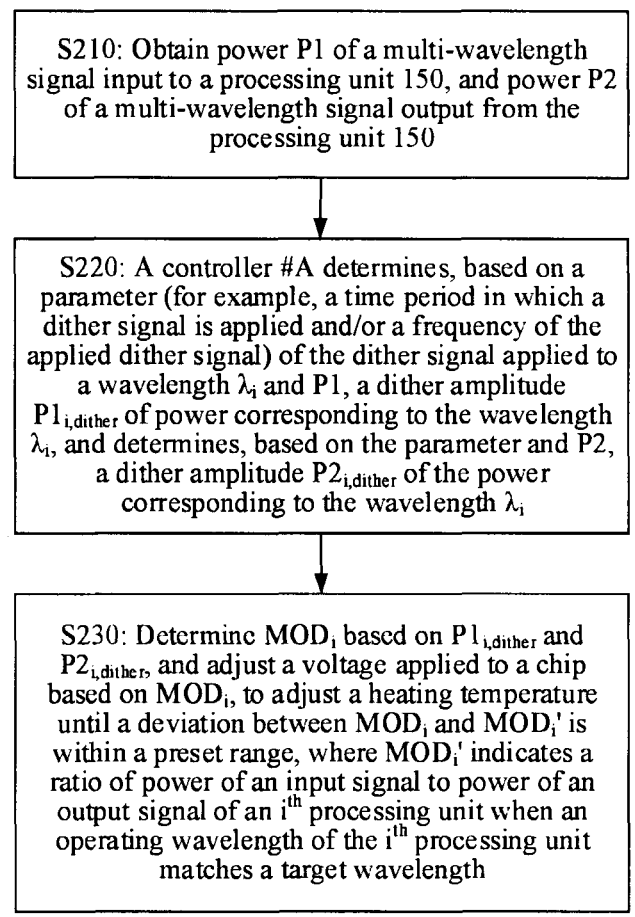
FIG. 7 is a schematic diagram of an example of an optical signal processing method according to this application.

FIG. 7 is a schematic diagram of an example of an optical signal processing method according to this application. The method is applied to the optical signal processing apparatus shown in FIG. 1A and FIG. 1B or FIG. 6A and FIG. 6B.

As shown in FIG. 7, in S210, a controller #A obtains (for example, obtains from the detection unit 170) power P1 of the multi-wavelength signal input to the processing unit 150, and the controller #A obtains (for example, obtains from the detection unit 180) power P2 of a multi-wavelength signal output from the processing unit 150.

In S220, the controller #A determines, based on a parameter (for example, a time period in which a dither signal is applied and/or a frequency of the applied dither signal) of the dither signal applied to an $i^{th}$ wavelength $\lambda_i$ in N wavelengths included in the multi-wavelength signal and P1, power $P1_i$ corresponding to the $i^{th}$ wavelength $\lambda_i$, and determines, based on the parameter of the dither signal applied to the wavelength $\lambda_i$ and P2, power $P2_i$ corresponding to the $i^{th}$ wavelength $\lambda_i$. This process is similar to the process described in the foregoing manner A to manner C. To avoid repetition, detailed descriptions thereof are omitted herein. $i \in [1, N]$.

In S230, the controller #A determines $MOD_i$ based on $P1_i$ and $P2_i$, and adjusts, based on $MOD_i$, a voltage applied to a chip, to adjust a heating temperature.

For example, if $MOD_i$ is greater than $MOD_i'$, the applied voltage may be decreased. To be specific, the heating temperature may be decreased until a deviation between $MOD_i$ and $MOD_i'$ is within a preset range. $MOD_i'$ represents a ratio of power of an input signal to power of an output signal of the $i^{th}$ processing subunit when an operating wavelength of the $i^{th}$ processing subunit matches a target wavelength.

If $MOD_i$ is less than $MOD_i'$, the applied voltage may be increased. To be specific, the heating temperature may be increased until the deviation between $MOD_i$ and $MOD_i'$ is within the preset range.

A specific process of S210 to S230 may be similar to the process performed by the controller 165. To avoid repetition, detailed descriptions thereof are omitted herein.

In a possible implementation, the method further includes: S240. The controller #A controls the dither application unit 120 to apply a dither signal to the light source unit 110. A specific process of S240 may be similar to the process performed by the controller 125. To avoid repetition, detailed descriptions thereof are omitted herein.

In another possible implementation, the method further includes: S250. The controller #A controls the light source unit 110 to generate an optical signal. A specific process of S250 may be similar to the process performed by the controller 145. To avoid repetition, detailed descriptions thereof are omitted herein.

Figure 8:
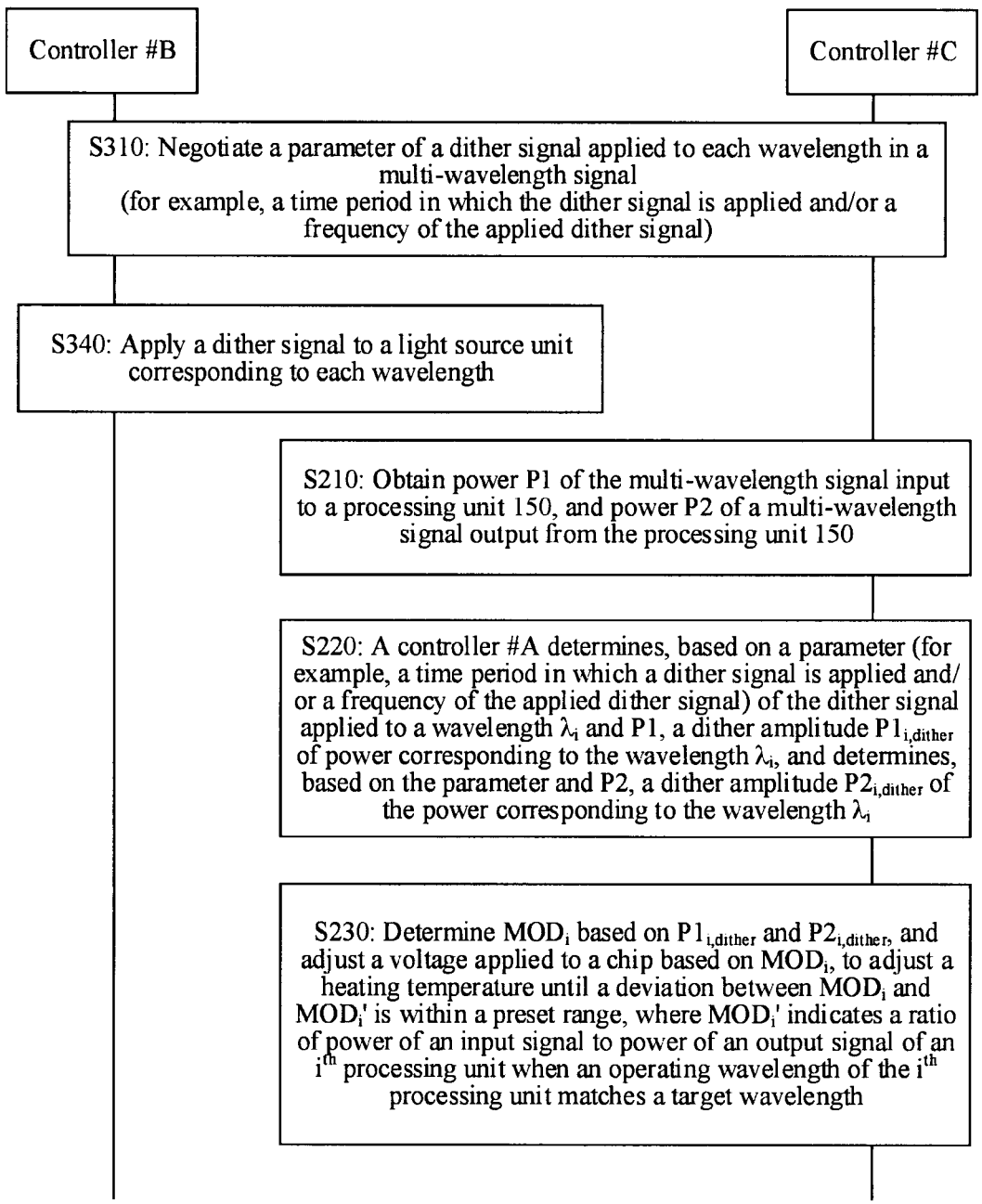
FIG. 8 is a schematic diagram of another example of an optical signal processing method according to this application.

FIG. 8 is a schematic diagram of an example of an optical signal processing method according to this application. The method is applied to the optical signal processing apparatus shown in FIG. 1A and FIG. 1B or FIG. 6A and FIG. 6B.

As shown in FIG. 8, in S310, a controller #B and a controller #C negotiate a parameter of a dither signal applied to an $i^{th}$ wavelength $\lambda_i$ in N wavelengths included in a multi-wavelength signal, where $i \in [1, N]$.

By way of example, and not limitation, the parameter may be determined by the controller #B and sent to the controller #C, or the parameter may be determined by the controller #C and sent to the controller #B. This is not particularly limited in this application.

In S340, the controller #B applies a dither signal to each wavelength (or a light source unit corresponding to each wavelength) based on the negotiated parameter.

In S320, the controller #C determines, based on the parameter (for example, a time period in which the dither signal is applied and/or a frequency of the applied dither signal) of the dither signal applied to the $i^{th}$ wavelength $\lambda_i$ in the multi-wavelength signal and P1, power P1$_i$ corresponding to the $i^{th}$ wavelength $\lambda_i$, and determines, based on the parameter of the dither signal applied to the wavelength $\lambda_i$ and P2, power P2$_i$ corresponding to the $i^{th}$ wavelength $\lambda_i$. This process is similar to the process described in the foregoing manner A to manner C. To avoid repetition, detailed descriptions thereof are omitted herein.

In S330, the controller #C determines MOD$_i$ based on P1$_i$ and P2$_i$, and adjusts, based on MOD$_i$, a voltage applied to a chip, to adjust a heating temperature.

For example, if MOD$_i$ is greater than MOD$_i'$, the applied voltage may be decreased. To be specific, the heating temperature may be decreased until the deviation between MOD$_i$ and MOD$_i'$ is within the preset range. MOD$_i'$ represents a ratio of power of an input signal to power of an output signal of the processing subunit when the operating wavelength of the $i^{th}$ processing subunit matches the target wavelength.

If MOD$_i$ is less than MOD$_i'$, the applied voltage may be increased. To be specific, the heating temperature may be increased until a deviation between MOD$_i$ and MOD$_i'$ is within a preset range.

A specific process performed by the controller #B may be similar to the process performed by the controller 125. To avoid repetition, detailed descriptions thereof are omitted herein.

A specific process performed by the controller #C may be similar to the process performed by the controller 165. To avoid repetition, detailed descriptions thereof are omitted herein.

Figure 9:
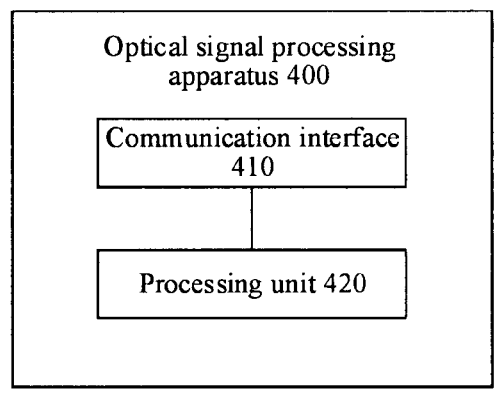
FIG. 9 is a schematic diagram of an example of a control apparatus according to this application.

FIG. 9 is a schematic block diagram of an optical signal processing apparatus according to this application. As shown in FIG. 9, the apparatus 400 includes a communication interface 410 and a processing unit 420.

The processing unit 420 is configured to perform a feedback process performed by the controller (for example, the controller 165), namely, a specific process of S210 to S230. To avoid repetition, detailed descriptions thereof are omitted herein.

For example, the communication interface 410 is configured to perform signal receiving and sending processes of the controller (for example, the controller 165). To avoid repetition, detailed descriptions thereof are omitted herein.

In the foregoing implementations, the communication interface 410 may include an output interface, and the output interface is configured to implement an output (or a sending) function.

Optionally, the communication interface 410 may alternatively be an interface circuit. For example, the interface circuit may include an input circuit and an output circuit.

Optionally, in an example, the apparatus 400 may be the controller in the method embodiments; or the controller has a chip, an integrated circuit, a component, a module, or the like that implements functions of the foregoing controller.

Optionally, the processing unit 420 may be a processing apparatus. A function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, so that the apparatus 400 performs operations and/or processing performed by the controller in the method embodiments.

Optionally, the processing apparatus may include only the processor, and the memory configured to store the computer program is located outside the processing apparatus. The processor is connected to the memory through a circuit/wire, to read and execute the computer program stored in the memory.

In some examples, the processing apparatus may alternatively be a chip or an integrated circuit. For example, the processing apparatus includes a processing circuit/logic circuit and an interface circuit. The interface circuit is configured to: receive a signal and/or data, and transmit the signal and/or data to the processing circuit. The processing circuit processes the signal and/or the data, to implement functions of the control device in the method embodiments.

Figure 10:
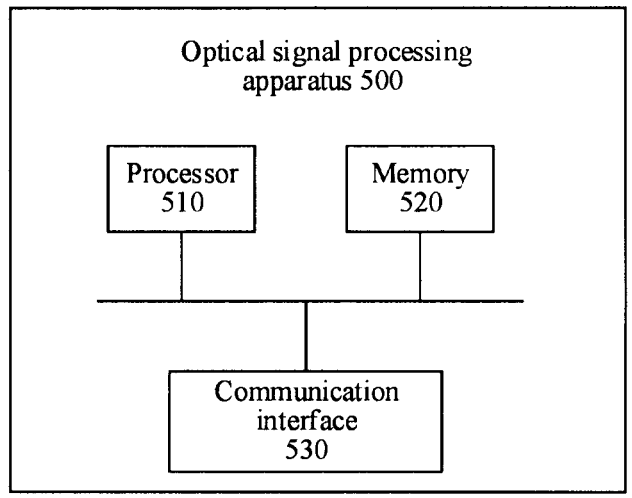
FIG. 10 is a schematic diagram of another example of a control apparatus according to this application.

FIG. 10 is a schematic diagram of a structure of an optical signal processing apparatus according to this application. As shown in FIG. 10, the optical signal processing apparatus 500 includes one or more processors 510, one or more memories 520, and one or more communication interfaces 530. The processor 510 is configured to control the communication interface 530 to receive and send information. The memory 520 is configured to store a computer program. The processor 510 is configured to invoke the computer program from the memory 520 and run the computer program, so that the apparatus 500 performs processing and/or operations performed by the controller (for example, the controller 165) in the method embodiments of this application, namely, the actions of S210 to S230.

For example, the processor 510 may have a function of the processing unit 420 in FIG. 10, and the communication interface 530 may have a function of the communication interface 410 in FIG. 10.

Optionally, the memory and the processor in the foregoing apparatus embodiments may be physically independent units, or the memory may be integrated into the processor. This is not limited in this specification.

In addition, this application further provides a computer-readable storage medium. The computer-readable storage medium stores computer instructions. When the computer instructions are run on a computer, the computer is enabled to perform the operation and/or procedure performed by the control device in the method embodiments of this application.

In addition, this application further provides a computer program product. The computer program product includes computer program code or instructions. When the computer program code or the instructions is/are run on a computer, the operation and/or procedure performed by the control device in the method embodiments of this application are/is performed.

In addition, this application further provides a chip. The chip includes a processor. A memory configured to store a computer program is disposed independent of the chip. The processor is configured to execute the computer program stored in the memory, so that a controller in which the chip is installed performs the operation and/or processing performed by the controller in any method embodiment.

Further, the chip may include a communication interface. The communication interface may be an input/output interface, an interface circuit, or the like. Further, the chip may include the memory.

In addition, this application further provides a communication apparatus (for example, may be a chip), including a processor and a communication interface. The communication interface is configured to receive a signal and transmit the signal to the processor, and the processor processes the signal, so that the operation and/or processing performed by the controller in any method embodiment are/is performed.

In addition, this application further provides an optical switching apparatus, including at least one processor, the at least one processor is coupled to at least one memory, and the at least one processor is configured to execute a computer program or instructions stored in the at least one memory, so that the operation and/or processing performed by the control device in any method embodiment are/is performed.

The processor in embodiments of this application may be an integrated circuit chip, and has a signal processing capability. In an implementation process, the steps in the foregoing method embodiments can be implemented by a hardware integrated logical circuit in the processor, or by instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, RAMs in many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). Notably, the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it can be understood that the disclosed system, apparatus, and method may be implemented in other manners. For example, the described apparatus embodiments are merely examples. Division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this application.

The foregoing descriptions are merely specific implementations of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical signal processing apparatus, used in signal processing of a multi-wavelength signal comprising N wavelengths, wherein the optical signal processing apparatus comprises: N light sources, a wavelength multiplexer, an optical processor, at least one dither application circuit, a first detection circuit, a second detection circuit, and a feedback control circuit, wherein N≥2, and wherein:
the N light sources one-to-one correspond to the N wavelengths, and each light source is configured to generate a single-wavelength signal of the corresponding wavelength;
the dither application circuit is configured to apply a dither signal to each light source to make power of each single-wavelength signal change based on the dither signal, wherein first parameters of any two single-wavelength signals are different, and each first parameter comprises at least one of the following parameters: a time period in which the dither signal is applied or a frequency of the applied dither signal;
the wavelength multiplexer is configured to perform wavelength multiplexing processing on the N single-wavelength signals to generate the multi-wavelength signal;
the optical processor comprises N processing subunits, the N processing subunits are serially connected, the N processing subunits one-to-one correspond to the N wavelengths, and each processing subunit is configured to process the corresponding wavelength;
the first detection circuit is configured to obtain a first power signal corresponding to the multi-wavelength signal input to the optical processor;
the second detection circuit is configured to obtain a second power signal corresponding to a multi-wavelength signal output from the optical processor; and
the feedback control circuit is configured to adjust a working parameter of an $i^{th}$ processing subunit in the N processing subunits based on a first parameter of a dither signal corresponding to an $i^{th}$ single-wavelength signal in the N single-wavelength signals, the first power signal, and the second power signal, wherein the $i^{th}$ single-wavelength signal corresponds to the $i^{th}$ processing subunit, and i∈[1, N].

2. The optical signal processing apparatus according to claim 1, wherein there are N dither application circuits, the N dither application circuits one-to-one correspond to the N light sources, and each dither application circuit is configured to apply a dither signal to the corresponding light source.

3. The optical signal processing apparatus according to claim 2, wherein:
each dither application circuit is configured to apply the dither signal to the corresponding light source in a first time period, and the first detection circuit is configured to obtain the first power signal in the first time period; and
the second detection circuit is configured to obtain the second power signal in the first time period, wherein duration of the first time period is longer than a periodicity of the dither signal.

4. The optical signal processing apparatus according to claim 2, wherein frequencies of dither signals applied by any two dither application circuits are different, and the feedback control circuit is configured to:
perform Fourier transform on the first power signal to obtain N first values, wherein the N first values one-to-one correspond to frequencies of the N dither signals;
perform Fourier transform on the second power signal to obtain N second values, wherein the N second values one-to-one correspond to the frequencies of the N dither signals; and
adjust the working parameter of the $i^{th}$ processing subunit based on a first value and a second value that correspond to an $i^{th}$ dither signal, wherein the $i^{th}$ dither signal corresponds to the $i^{th}$ single-wavelength signal.

5. The optical signal processing apparatus according to claim 2, wherein frequencies of dither signals applied by any two dither application circuits are different, and the apparatus further comprises at least one first filter and at least one second filter, wherein:
the first filter is configured to filter the first power signal based on a frequency of the dither signal applied to each single-wavelength signal, to obtain N third values, wherein the N third values one-to-one correspond to the frequencies of the N dither signals;
the second filter is configured to filter the second power signal based on the frequency of the dither signal applied to each single-wavelength signal, to obtain N fourth values, wherein the N fourth values one-to-one correspond to the frequencies of the N dither signals; and
the feedback control circuit is configured to adjust the working parameter of the $i^{th}$ processing subunit based on a third value and a fourth value that correspond to the $i^{th}$ dither signal, wherein the $i^{th}$ dither signal corresponds to the $i^{th}$ single-wavelength signal.

6. The optical signal processing apparatus according to claim 5, wherein:
there are N first filter and N second filter, wherein the N first filter one-to-one correspond to the frequencies of the N dither signals, and each first filter is configured to filter the first power signal based on the corresponding frequency of the dither signal; and
the N second filter one-to-one correspond to the frequencies of the N dither signals, and each second filter is configured to filter the second power signal based on the corresponding frequency of the dither signal.

7. The optical signal processing apparatus according to claim 1, wherein:
the N light sources one-to-one correspond to N time periods, and the dither application circuit is configured to apply a dither signal to an $i^{th}$ light source in an $i^{th}$ time period of the N time periods, wherein the $i^{th}$ light source is configured to generate the $i^{th}$ single-wavelength signal; and
the feedback control circuit is configured to adjust the working parameter of the $i^{th}$ processing subunit based on the first power signal obtained by the first detection circuit in the $i^{th}$ time period and the second power signal obtained by the second detection circuit in the $i^{th}$ time period.

8. The optical signal processing apparatus according to claim 1, wherein each processing subunit comprises a microring resonator.

9. The optical signal processing apparatus according to claim 1, wherein:
the optical processor comprises a modulator; or
the optical processor comprises a third filter; or
the optical processor comprises a dispersion compensator.

10. The optical signal processing apparatus according to claim 1, wherein the frequency of the dither signal is less than a first threshold, and the first threshold is determined based on a data modulation frequency of the single-wavelength signal.

11. An optical signal processing method, applied to signal processing of a multi-wavelength signal comprising N wavelengths, wherein the optical signal processing method comprises:
applying a dither signal to each light source of each of the N wavelengths, to make power of a single-wavelength signal generated by the light source change based on the dither signal, wherein first parameters of any two single-wavelength signals are different, and each first parameter comprises at least one of the following parameters: a time period in which the dither signal is applied or a frequency of the applied dither signal;
performing wavelength multiplexing processing on the single-wavelength signals to generate the multi-wavelength signal;
detecting a first power signal corresponding to the multi-wavelength signal input to an optical processor, wherein the optical processor is configured to process the multi-wavelength signal, the optical processor comprises N processing subunits, the N processing subunits are serially connected, the N processing subunits one-to-one correspond to the N wavelengths, and each processing subunit is configured to process the corresponding wavelength;
detecting a second power signal corresponding to a multi-wavelength signal output from the optical processor; and
adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal, wherein the $i^{th}$ single-wavelength signal corresponds to the $i^{th}$ processing subunit, and $i \in [1, N]$.

12. The optical signal processing method according to claim 11, wherein frequencies of dither signals applied to any two single-wavelength signals are different, and wherein the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal comprises:
performing Fourier transform on the first power signal to obtain N first values, wherein the N first values one-to-one correspond to frequencies of the N dither signals;
performing Fourier transform on the second power signal to obtain N second values, wherein the N second values one-to-one correspond to the frequencies of the N dither signals; and
adjusting the working parameter of the $i^{th}$ processing subunit based on a first value and a second value that correspond to an $i^{th}$ dither signal, wherein the $i^{th}$ dither signal corresponds to the $i^{th}$ single-wavelength signal.

13. The optical signal processing method according to claim 12, wherein frequencies of dither signals applied to any two single-wavelength signals are different, and wherein the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal comprises:
filtering the first power signal based on a frequency of the dither signal applied to each single-wavelength signal, to obtain N third values, wherein the N third values one-to-one correspond to the frequencies of the N dither signals;
filtering the second power signal based on the frequency of the dither signal applied to each single-wavelength signal, to obtain N fourth values, wherein the N fourth values one-to-one correspond to the frequencies of the N dither signals; and
adjusting the working parameter of the $i^{th}$ processing subunit based on a third value and a fourth value that correspond to the $i^{th}$ dither signal, wherein the $i^{th}$ dither signal corresponds to the $i^{th}$ single-wavelength signal.

14. The optical signal processing method according to claim 11, wherein:
the applying a dither signal to each light source of each of the N wavelengths comprises applying a dither signal to an $i^{th}$ light source in an $i^{th}$ time period of N time periods, wherein the $i^{th}$ light source is configured to generate the $i^{th}$ single-wavelength signal, and the N light sources one-to-one correspond to the N time periods; and
the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal comprises adjusting the working parameter of the $i^{th}$ processing subunit based on a first power signal detected in the $i^{th}$ time period and a second power signal detected in the $i^{th}$ time period.

15. The optical signal processing method according to claim 11, wherein each processing subunit comprises a microring resonator.

16. The optical signal processing method according to claim 11, wherein the optical processor comprises an optical modulator;
the optical processor comprises a filter; or
the optical processor comprises a dispersion compensator.

17. A non-transitory computer readable medium storing programming instructions for execution by at least one processor, wherein the programming instructions are applied to signal processing of a multi-wavelength signal comprising N wavelengths, and wherein the programming instructions, when executed by the at least one processor, cause a computer to perform operations comprising:
applying a dither signal to each light source of each of the N wavelengths, to make power of a single-wavelength signal generated by the light source change based on the dither signal, wherein first parameters of any two single-wavelength signals are different, and each first parameter comprises at least one of the following parameters: a time period in which the dither signal is applied or a frequency of the applied dither signal;
performing wavelength multiplexing processing on the single-wavelength signals to generate the multi-wavelength signal;
detecting a first power signal corresponding to the multi-wavelength signal input to an optical processor, wherein the optical processor is configured to process the multi-wavelength signal, the optical processor comprises N processing subunits, the N processing subunits are serially connected, the N processing subunits one-to-one correspond to the N wavelengths, and each processing subunit is configured to process the corresponding wavelength;

detecting a second power signal corresponding to a multi-wavelength signal output from the optical processor; and adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal, wherein the $i^{th}$ single-wavelength signal corresponds to the $i^{th}$ processing subunit, and $i \in [1, N]$.

18. The non-transitory computer readable medium according to claim 17, wherein frequencies of dither signals applied to any two single-wavelength signals are different, and wherein the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal comprises:

performing Fourier transform on the first power signal to obtain N first values, wherein the N first values one-to-one correspond to frequencies of the N dither signals;

performing Fourier transform on the second power signal to obtain N second values, wherein the N second values one-to-one correspond to the frequencies of the N dither signals; and adjusting the working parameter of the $i^{th}$ processing subunit based on a first value and a second value that correspond to an $i^{th}$ dither signal, wherein the $i^{th}$ dither signal corresponds to the $i^{th}$ single-wavelength signal.

19. The optical signal processing apparatus according to claim 17, wherein frequencies of dither signals applied to any two single-wavelength signals are different, and wherein the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal comprises:

filtering the first power signal based on a frequency of the dither signal applied to each single-wavelength signal, to obtain N third values, wherein the N third values one-to-one correspond to the frequencies of the N dither signals;

filtering the second power signal based on the frequency of the dither signal applied to each single-wavelength signal, to obtain N fourth values, wherein the N fourth values one-to-one correspond to the frequencies of the N dither signals; and adjusting the working parameter of the $i^{th}$ processing subunit based on a third value and a fourth value that correspond to the $i^{th}$ dither signal, wherein the $i^{th}$ dither signal corresponds to the $i^{th}$ single-wavelength signal.

20. The optical signal processing apparatus according to claim 17, wherein the applying a dither signal to each light source unit of each of the N wavelengths comprises:

applying a dither signal to an $i^{th}$ light source unit in an $i^{th}$ time period of N time periods, wherein the $i^{th}$ light source unit is configured to generate the $i^{th}$ single-wavelength signal, and the N light source units one-to-one correspond to the N time periods; and wherein the adjusting a working parameter of an $i^{th}$ processing subunit in the N processing subunits based on a first parameter of a dither signal corresponding to an $i^{th}$ single-wavelength signal in the N single-wavelength signals, the first power signal, and the second power signal comprises:

adjusting the working parameter of the $i^{th}$ processing subunit based on a first power signal detected in the $i^{th}$ time period and a second power signal detected in the $i^{th}$ time period.

\* \* \* \* \*